US010623981B2

(12) United States Patent
Lin et al.

(10) Patent No.: US 10,623,981 B2
(45) Date of Patent: Apr. 14, 2020

(54) INFORMATION TRANSMISSION METHOD, APPARATUS, AND SYSTEM

(71) Applicant: Huawei Technologies Co., Ltd., Shenzhen (CN)

(72) Inventors: Bo Lin, Beijing (CN); Liji Wu, Beijing (CN); Jie Shi, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 322 days.

(21) Appl. No.: 15/135,091

(22) Filed: Apr. 21, 2016

(65) Prior Publication Data

US 2016/0234713 A1    Aug. 11, 2016

Related U.S. Application Data

(63) Continuation of application No. PCT/CN2013/085822, filed on Oct. 23, 2013.

(51) Int. Cl.
*H04W 76/27* (2018.01)
*H04W 28/02* (2009.01)
(Continued)

(52) U.S. Cl.
CPC ....... *H04W 28/0268* (2013.01); *H04L 5/0035* (2013.01); *H04L 5/0055* (2013.01);
(Continued)

(58) Field of Classification Search
CPC ......... H04W 28/0268; H04W 72/0413; H04W 72/042; H04W 76/046; H04L 5/0035; H04L 5/0055
See application file for complete search history.

(56) References Cited

U.S. PATENT DOCUMENTS

2007/0121542 A1* 5/2007 Lohr ................. H04L 47/10
370/329
2011/0207493 A1* 8/2011 Taoka ............... H04L 5/0028
455/509

(Continued)

FOREIGN PATENT DOCUMENTS

CN       102378183 A    3/2012
CN       102378374 A    3/2012
(Continued)

OTHER PUBLICATIONS

"Challenges in the Uplink to Support Dual Connectivity," Agenda item: 7.2.1, Source: Intel Corporation, Document for: Discussion and Decision, 3GPP TSG RAN WG2 Meeting #82, R2-131986, Fukuoka, Japan, May 25-30, 2013, 7 pages.

*Primary Examiner* — Kodzovi Acolatse
(74) *Attorney, Agent, or Firm* — Slater Matsil, LLP

(57) ABSTRACT

Embodiments of the present invention provide an information transmission method. The method includes: determining, by the first network node, a first radio resource and a second radio resource that are different from each other, where the first radio resource is a resource used for transmitting first uplink information between the user equipment and the first network node and the second radio resource is a resource used for transmitting second uplink information between the user equipment and the second network node; and sending, by the first network node, uplink transmission configuration information to the user equipment, where the uplink transmission configuration information is used to indicate the first radio resource and the second radio resource, so that the user equipment sends the first uplink information and the second uplink information according to the uplink transmission configuration information.

16 Claims, 10 Drawing Sheets

(51) Int. Cl.
*H04W 72/04* (2009.01)
*H04L 5/00* (2006.01)

(52) U.S. Cl.
CPC ..... *H04W 72/042* (2013.01); *H04W 72/0413* (2013.01); *H04W 76/27* (2018.02)

(56) References Cited

U.S. PATENT DOCUMENTS

| | | | |
|---|---|---|---|
| 2013/0163485 A1 | 6/2013 | Wan et al. | |
| 2013/0250881 A1 | 9/2013 | Liao et al. | |
| 2014/0071862 A1* | 3/2014 | Ji | H04L 5/0037 370/280 |
| 2014/0213249 A1* | 7/2014 | Kang | H04W 28/18 455/434 |
| 2014/0376398 A1* | 12/2014 | Li | H04L 1/0001 370/252 |
| 2015/0098322 A1* | 4/2015 | Chen | H04W 72/0413 370/230 |
| 2015/0222394 A1 | 8/2015 | Cheng et al. | |
| 2015/0305010 A1 | 10/2015 | Guan et al. | |
| 2016/0087770 A1 | 3/2016 | Chang et al. | |
| 2016/0174211 A1* | 6/2016 | Gao | H04L 1/1861 370/329 |

FOREIGN PATENT DOCUMENTS

| | | |
|---|---|---|
| CN | 102655682 A | 9/2012 |
| EP | 2611245 A1 | 7/2013 |
| EP | 2741552 A1 | 6/2014 |
| WO | 2013018857 A1 | 2/2013 |
| WO | 2013113390 A1 | 8/2013 |
| WO | 2013116988 A1 | 8/2013 |
| WO | 2014059592 A1 | 4/2014 |
| WO | 2014101233 A1 | 7/2014 |

* cited by examiner

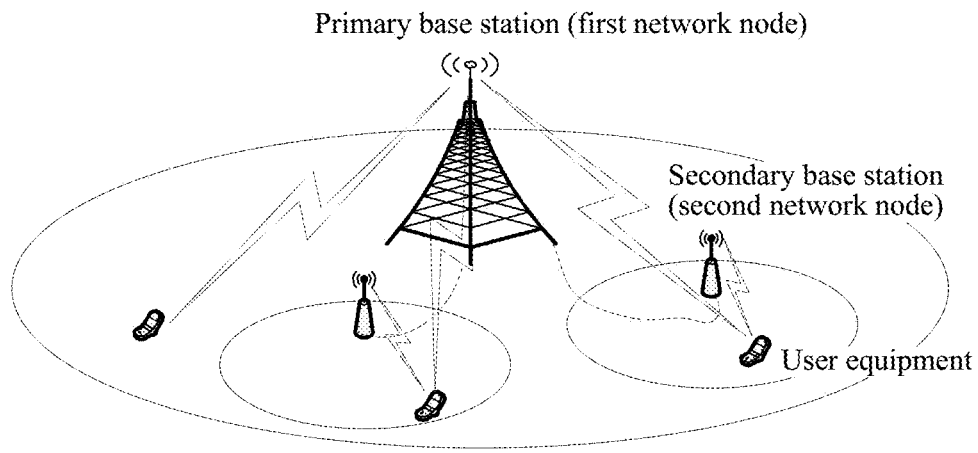

A first network node determines a first radio resource, where the first radio resource is a resource used for transmitting first uplink information between user equipment and the first network node; and the first network node determines a second radio resource, where the second radio resource is a resource used for transmitting second uplink information between the user equipment and a second network node, where the second radio resource is different from the first radio resource  — S110

The first network node sends uplink transmission configuration information to the user equipment, where the uplink transmission configuration information is used to indicate the first radio resource and the second radio resource, so that the user equipment sends the first uplink information to the first network node by using the first radio resource according to the uplink transmission configuration information and sends the second uplink information to the second network node by using the second radio resource according to the uplink transmission configuration information  — S120

The first network node receives the first uplink information sent by the user equipment  — S130

A second network node sends auxiliary information to a first network node, where the auxiliary information is used to indicate a transmission requirement of second uplink information, so that the first network node determines a second radio resource according to the auxiliary information — S310

A second network node determines a second radio resource according to a transmission requirement of second uplink information — S315

The second network node sends auxiliary information to a first network node, where the auxiliary information is used to indicate the second radio resource — S317

The second network node receives the second uplink information sent by user equipment, where the second uplink information is sent by the user equipment according to uplink transmission configuration information, and the uplink configuration information is used to indicate a first radio resource and the second radio resource that are different from each other, where the first radio resource is a resource used for transmitting first uplink information between the user equipment and the first network node and the second radio resource is a resource used for transmitting the second uplink information between the user equipment and the second network node — S320

User equipment receives uplink transmission configuration information sent by a first network node, where the uplink configuration information is used to indicate a first radio resource and a second radio resource that are different from each other, where the first radio resource is a resource used for transmitting first uplink information between the user equipment and the first network node and the second radio resource is a resource used for transmitting second uplink information between the user equipment and a second network node — S410

The user equipment performs a sending operation according to the uplink transmission configuration information, to send the first uplink information to the first network node by using the first radio resource and send the second uplink information to the second network node by using the second radio resource — S420

FIG. 6

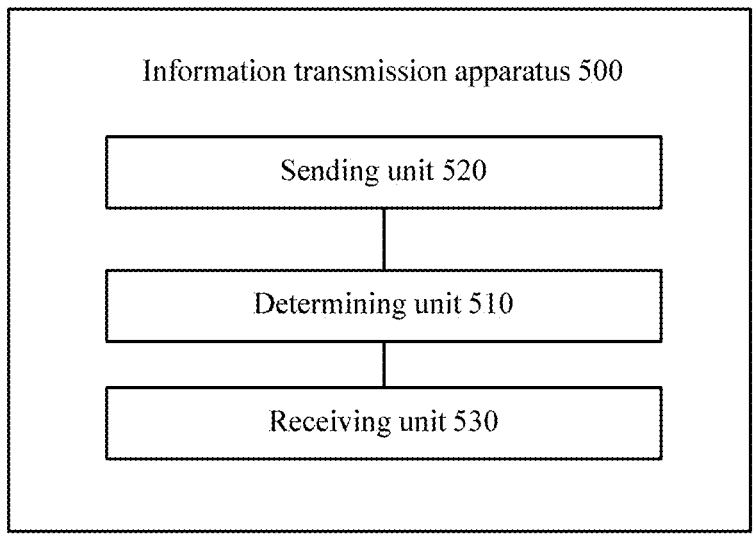

FIG. 7

INFORMATION TRANSMISSION METHOD, APPARATUS, AND SYSTEM

This application is a continuation of International Patent Application No. PCT/CN2013/085822, filed on Oct. 23, 2013, which is hereby incorporated by reference in its entirety.

TECHNICAL FIELD

The present invention relates to the communications field, and in particular, to an information transmission method, apparatus, and system.

BACKGROUND

In the carrier aggregation (CA) technology, one user equipment (UE) may be served by multiple downlink and/or uplink carriers, so as to improve a data rate of the UE. Under carrier aggregation, the UE may have serving cells of two different downlink carriers (or, network devices using different downlink carriers), where each downlink carrier corresponds to one uplink carrier. Certainly, the UE may also have serving cells of two different downlink carriers, where the two carriers share one uplink carrier. During uplink transmission, the UE transmits all uplink control information to one cell (for example, a primary cell), and the cell transmits uplink information, which needs to be sent to another cell (for example, a secondary cell), to the secondary cell.

In this way, the CA technology requires that an operator needs to configure a fiber backhaul network (ideal backhaul) between the two cells, so that the secondary cell can acquire the uplink information in time; therefore, deployment difficulties are increased.

Embodiments disclosed herein improve wireless communication efficiency through a technology that can be applied to a non-fiber backhaul network having a latency, avoiding a sending delay of physical uplink control channel information and a sending delay of physical uplink shared channel information that are caused by the latency of the backhaul network.

SUMMARY

Embodiments of the present invention provide an information transmission method, apparatus, and system, which can reduce network deployment difficulties.

According to a first aspect, an information transmission method is provided, where the method is executed by a first network node of at least two network nodes, where the first network node can send first downlink information to user equipment by using at least one first downlink carrier, a second network node of the at least two network nodes can send second downlink information to the user equipment by using at least one second downlink carrier, and the user equipment can send uplink information to the first network node and the second network node by using at least one uplink carrier, and the method includes: determining, by the first network node, a first radio resource, where the first radio resource is a resource used for transmitting first uplink information between the user equipment and the first network node, and determining, by the first network node, a second radio resource, where the second radio resource is a resource used for transmitting second uplink information between the user equipment and the second network node, where the first radio resource is different from the second radio resource; sending, by the first network node, uplink transmission configuration information to the user equipment, where the uplink transmission configuration information is used to indicate the first radio resource and the second radio resource, so that the user equipment sends the first uplink information to the first network node by using the first radio resource according to the uplink transmission configuration information and sends the second uplink information to the second network node by using the second radio resource according to the uplink transmission configuration information; and receiving, by the first network node, the first uplink information sent by the user equipment.

With reference to the first aspect, in a first implementation manner of the first aspect, the method further includes: acquiring, by the first network node, quality of service (QoS) of a current service of the user equipment; the determining, by the first network node, a first radio resource includes: determining, by the first network node, the first radio resource according to the QoS of the current service of the user equipment; and the determining, by the first network node, a second radio resource includes: determining, by the first network node, the second radio resource according to the QoS of the current service of the user equipment.

With reference to the first aspect and the foregoing implementation manner, in a second implementation manner of the first aspect, the determining, by the first network node, a first radio resource includes: determining, by the first network node, the first radio resource according to a transmission requirement of the first uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node.

With reference to the first aspect and the foregoing implementation manners, in a third implementation manner of the first aspect, the determining, by the first network node, a second radio resource includes: acquiring, by the first network node, auxiliary information from the second network node, where the auxiliary information is used to indicate a transmission requirement of the second uplink information, and/or the second radio resource, where the second radio resource is determined by the second network node according to the transmission requirement of the second uplink information and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node; and determining, by the first network node, the second radio resource according to the auxiliary information.

With reference to the first aspect and the foregoing implementation manners, in a fourth implementation manner of the first aspect, the uplink transmission configuration information is used to indicate a first period and a second period that are different from each other, and when the user equipment can send the uplink information to the first network node and the second network node by using one uplink carrier, the first period corresponds to at least one first uplink subframe of the uplink carrier and the second period corresponds to at least one second uplink subframe of the uplink carrier, where the first uplink subframe is different from the second uplink subframe.

With reference to the first aspect and the foregoing implementation manners, in a fifth implementation manner of the first aspect, the uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

With reference to the first aspect and the foregoing implementation manners, in a sixth implementation manner of the first aspect, the uplink transmission configuration information is specifically used to indicate a location of the first downlink subframe of the first downlink carrier and a time interval between the first uplink subframe and the first downlink subframe, and the uplink transmission configuration information is specifically used to indicate a location of the second downlink subframe of the second downlink carrier and a time interval between the second uplink subframe and the second downlink subframe.

According to an another aspect, an information transmission device is provided, where the device can send first downlink information to user equipment by using at least one first downlink carrier, a second network node can send second downlink information to the user equipment by using at least one second downlink carrier, and the user equipment can send uplink information to the device and the second network node by using at least one uplink carrier, and the device includes: a bus, a processor connected to the bus, a memory connected to the bus, and a transceiver connected to the bus, where the processor invokes, by using the bus, a program stored in the memory, to determine a first radio resource and a second radio resource that are different from each other, where the first radio resource is a resource used for transmitting first uplink information between the user equipment and the device and the second radio resource is a resource used for transmitting second uplink information between the user equipment and the second network node; control the transceiver to send uplink transmission configuration information to the user equipment, where the uplink transmission configuration information is used to indicate the first radio resource and the second radio resource, so that the user equipment sends the first uplink information to the device by using the first radio resource according to the uplink transmission configuration information and sends the second uplink information to the second network node by using the second radio resource according to the uplink transmission configuration information; and control the transceiver to receive the first uplink information sent by the user equipment.

According to the information transmission method, apparatus, and system provided in the embodiments of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of an architecture of an information transmission system according to an embodiment of the present invention;

FIG. 2 is a schematic flowchart of an information transmission method according to an embodiment of the present invention;

FIG. 5 is a schematic flowchart of an information transmission method according to another embodiment of the present invention;

FIG. 6 is a schematic flowchart of an information transmission method according to still another embodiment of the present invention;

FIG. 7 is a schematic block diagram of an information transmission apparatus according to an embodiment of the present invention;

DETAILED DESCRIPTION OF ILLUSTRATIVE EMBODIMENTS

Figure 3A:
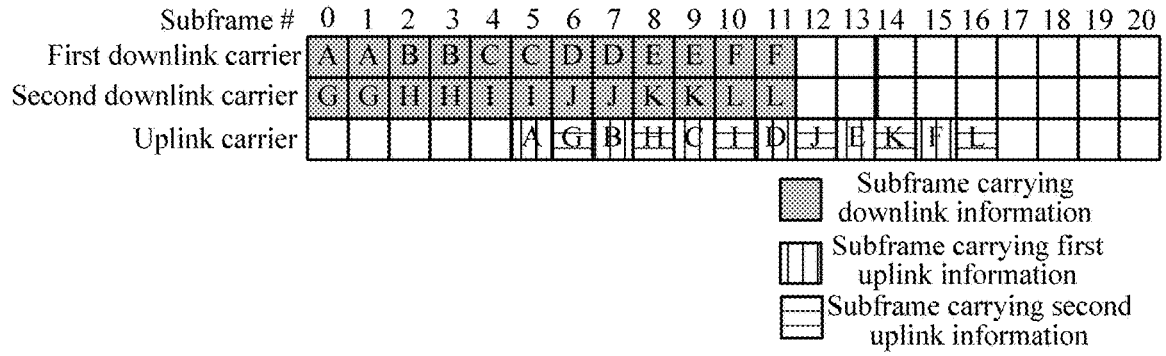
FIG. 3a is a schematic diagram of uplink transmission configuration information according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

FIG. 1 is a schematic architectural diagram of an information transmission system according to an embodiment of the present invention. As shown in FIG. 1, the technical solution of the present invention may be applied to a communications system including at least two network devices and at least one user equipment, and the communications system may be, for example, a Global System for Mobile Communications (GSM), a Code Division Multiple Access (CDMA) system, Wideband Code Division Multiple Access (WCDMA), General Packet Radio Service (GPRS), or Long Term Evolution (LTE).

User equipment (UE), also referred to as a mobile terminal (Mobile Terminal), mobile user equipment, and the like, may communicate with one or more core networks by using a radio access network (for example, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

In this embodiment of the present invention, the communications system may include at least two network nodes.

In addition, in this embodiment of the present invention, a first network node can send first downlink information to user equipment by using at least one first downlink carrier, and a second network node of the at least two network nodes can send second downlink information to the user equipment by using at least one second downlink carrier.

In this embodiment of the present invention, the user equipment may transmit uplink information to the network nodes by using one or more carriers, which is not specially limited in the present invention. Methods in the foregoing cases are described in detail subsequently.

In this embodiment of the present invention, the network nodes may be connected by using a fiber or the like to form an ideal backhaul, or the network nodes do not need to form an ideal backhaul, and instead, communicate with each other by using a wireless communication resource, which is not specially limited in the present invention.

In this embodiment of the present invention, the first network node and the second network node may be in a primary-secondary relationship, for example, the second network node may be a secondary node of the first network node; in this case, the first network node may be, for example, a base station (or a primary base station) of a primary cell serving the user equipment, and the second network node may be, for example, a base station (or a secondary base station) of a secondary cell serving the user equipment. Alternatively, the first network node may be, for example, a base station controller that provides a macro cell for the user equipment in the communications system, and the second network node may be, for example, a micro base station (Micro), a pico base station (Pico), or a home base station (or may also be referred to as a femto base station (femto)) that provides a micro cell for the user equipment.

Alternatively, similarly, in this embodiment of the present invention, the first network node may be a secondary node of the second network node.

A network node may be, for example, a base station (BTS) in the GSM or CDMA, may also be a base station (NodeB) in the WCDMA, or may also be an evolved Node B (eNB or e-NodeB) in the LTE, which is not limited in the present invention; however, for the convenience of description, the following embodiments are described by using an eNB as an example.

Alternatively, in this embodiment of the present invention, the first network node is a base station and the second network node is a device (for example, user equipment) supporting inter-device communication technologies; in this case, the second network node and the user equipment may communicate with each other by using the inter-device communication technologies.

Alternatively, in this embodiment of the present invention, the first network node and the second network node may be in an equal relationship, or, the first network node and the second network node may serve the user equipment without affecting each other.

It should be noted that, in a case in which the second network node can support device to device (D2D) transmission, a resource used by the second network node to transmit information (the second downlink information) to the user equipment may be an uplink transmission resource in the communications system, or may be a resource not used in the communications system.

FIG. 2 is a schematic flowchart of an information transmission method 100 described from the perspective of a first network node (for example, a base station of a primary cell or a primary base station). As shown in FIG. 2, the method 100 includes:

S110: The first network node determines a first radio resource, where the first radio resource is a resource used for transmitting first uplink information between user equipment and the first network node; and the first network node determines a second radio resource, where the second radio resource is a resource used for transmitting second uplink information between the user equipment and a second network node, where the second radio resource is different from the first radio resource.

S120: The first network node sends uplink transmission configuration information to the user equipment, where the uplink transmission configuration information is used to indicate the first radio resource and the second radio resource, so that the user equipment sends the first uplink information to the first network node by using the first radio resource according to the uplink transmission configuration information and sends the second uplink information to the second network node by using the second radio resource according to the uplink transmission configuration information.

S130: The first network node receives the first uplink information sent by the user equipment.

Specifically, in S110, the first network node may determine a radio resource that is used by the user equipment to transmit uplink information, where the radio resource may include a radio resource (the first radio resource) used for communication between the user equipment and the first network node and a radio resource (the second radio resource) used for communication between the user equipment and the second network node. It should be noted that, in this embodiment of the present invention, the radio resource may include a time domain resource and/or a frequency domain resource. Notification manners (uplink configuration information) corresponding to the various types of resources are described in detail subsequently.

In addition, in this embodiment of the present invention, the first network node can send first downlink information to the user equipment by using at least one first downlink carrier, and the second network node in at least two network nodes can send second downlink information to the user equipment by using at least one second downlink carrier.

Specifically, downlink carriers (or carrier frequencies) used by the at least two network nodes to send the downlink information to the user equipment may be different. Therefore, the network devices may send the downlink information to the user equipment at the same time, which improves a downlink throughput of a communications system.

Optionally, the first uplink information is feedback information of the first downlink information; and the second uplink information is feedback information of the second downlink information.

Specifically, in this embodiment of the present invention, the downlink information may be, for example, data or information with a hybrid automatic repeat request (HARQ), and requires feedback by the user equipment, so that the network node executes resource scheduling according to the feedback. In this case, the uplink information may be feedback information of the downlink information, for example, may be acknowledgement (ACK) information or negative acknowledgement (NACK) information of the HARQ.

It should be understood that, the foregoing listed information and parameters that are used as the uplink information and the downlink information are merely exemplary, and the present invention is not limited thereto. Other parameters and information that are in a feedback relationship or response relationship shall fall within the protection scope of the present invention.

Optionally, the first uplink information includes at least one type of the following information: physical uplink control channel information, physical uplink shared channel information, and an uplink reference signal; and the second uplink information includes at least one type of the following information: physical uplink control channel information, physical uplink shared channel information, and an uplink reference signal.

Specifically, in this embodiment of the present invention, the uplink information may be, for example, the following information:

information transmitted by using a physical uplink control channel (PUCCH), information transmitted by using a physical uplink shared channel (PUSCH), and an uplink reference signal, where the physical uplink control channel information includes at least one type of the following information:

acknowledgement (ACK) information of a hybrid automatic repeat request (HARQ), negative acknowledgement (NACK) information of the HARQ, and scheduling request information.

Specifically, the uplink information transmitted by using the PUCCH may be, for example, an ACK or a NACK, from a network node, of an HARQ, or may be an HARQ sent to a network node.

It should be understood that, the foregoing listed parameters and information are merely exemplary, and other information that can be transmitted by using the PUCCH shall fall within the protection scope of the present invention.

In addition, the physical uplink shared channel information includes at least one type of the following information:

retransmitted uplink data and newly-transmitted uplink data.

Specifically, the uplink information transmitted by using the PUSCH may be data that is retransmitted according to an HARQ from a network node, or may be newly-transmitted data, which is not specially limited herein.

The following describes a method in which the first network node determines the first radio resource and the second radio resource.

Optionally, the first radio resource and the second radio resource are determined according to at least one type of the following information:

quality of service (QoS) of a current service of the user equipment, a data transmission requirement of the first uplink information, and a data transmission requirement of the second uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node; and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node.

It should be understood that, the three listed parameters may be used independently, or may be used in a combination manner, which is not specially limited in the present invention. The following separately describes methods of using the foregoing parameters.

1. Quality of Service (QoS) of the Current Service of the User Equipment

Optionally, the method further includes:

acquiring, by the first network node, the quality of service (QoS) of the current service of the user equipment;

the determining, by the first network node, a first radio resource includes:

determining, by the first network node, the first radio resource according to the QoS of the current service of the user equipment; and the determining, by the first network node, a second radio resource includes:

determining, by the first network node, the second radio resource according to the QoS of the current service of the user equipment.

In this embodiment of the present invention, a bearer used for data transmission is set between a gateway device and each network node in the communications system. For example, a bearer used to transmit a service accessed by the user equipment may be set between the gateway device and the first network node and between the gateway device and the second network node. The user equipment may access a target service by using the first network node and the second network node (for example, the two nodes each transmit a part of data of the service), and service transmission depends on a transmission resource. If transmission resources are insufficient, quality of service (QoS) of a service cannot be satisfied, which may affect user experience of a user, and even causes service interruption. Therefore, the first network node may determine QoS of the target service, where in this embodiment of the present invention, the QoS may include a priority of the service (specifically, a priority of the target service among all services transmitted by using the gateway device) and bit rate requirement information of the service. If the target service has a relatively high priority, the first network node may allocate a relatively large quantity of radio resources (uplink transmission resources) to the user equipment, for example, the first network node may allocate to the user equipment a relatively long uplink transmission period or a relatively large quantity of subcarriers used for uplink transmission, so as to ensure that a QoS requirement of the user equipment is satisfied. Similarly, if the target service has a relatively high bit rate requirement, the first network node may allocate a relatively large quantity of radio resources (uplink transmission resources) to the user equipment.

It should be understood that, in this embodiment of the present invention, parameters (the priority of the service and the bit rate requirement information of the service) included in the QoS of the service may be used independently, or may be used in a combination manner, which is not specially limited in the present invention.

2. Data Transmission Requirement of the First Uplink Information

Optionally, the determining, by the first network node, a first radio resource includes:

determining, by the first network node, the first radio resource according to the transmission requirement of the first uplink information, where the transmission requirement of the first uplink information includes at least one of the following parameters:

the data volume of the first uplink information, the transmission rate requirement of the first uplink information, the maximum tolerable delay of the first uplink information, the transmission channel status of the first uplink information, the QoS of the first uplink information, and the load status of the first network node.

In this embodiment of the present invention, the data transmission requirement of the first uplink information may be used to determine the radio resource used for transmitting the first uplink information, for example, when the first uplink information has a relatively high data volume, it indicates that the a scheduling requirement of the user equipment in the first network node is relatively high, and relatively to another user equipment performing communication by using the first network node, the user equipment requires more radio resources (uplink transmission resources); therefore, the first network node may allocate a relatively large quantity of radio resources (uplink transmission resources) to the user equipment. Similarly, when the first uplink information has a relatively large transmission rate requirement, it indicates that the scheduling requirement of the user equipment in the first network node is relatively high, and relatively to another user equipment performing communication by using the first network node, the user equipment requires more radio resources. When the first uplink information has a relatively low maximum tolerable delay, it indicates that the scheduling requirement of the user equipment in the first network node is relatively high, and relatively to another user equipment performing communication by using the first network node, the user equipment requires more radio resources.

In addition, when a channel for transmitting the first uplink information between the user equipment and the first network node has relatively good channel quality, the first network node may reduce radio resources allocated to the user equipment; otherwise, the first network node needs to allocate more radio resources to the user equipment.

In addition, when the first network node has relatively high load, there are a relatively small quantity of radio resources that the first network node can use, and a small quantity of first uplink radio resources that the first network node can allocate.

In addition, a bearer used for data transmission is set between a gateway device and each network node in the communications system. For example, a bearer used to transmit a service accessed by the user equipment may be set between the gateway device and the first network node and between the gateway device and the second network node. The user equipment may access a first target service (for example, a part of the foregoing target service) by using the first network node, and service transmission depends on a transmission resource. If transmission resources are insufficient, QoS of the service cannot be satisfied, which may affect user experience of the user, and even may cause service interruption. Therefore, the first network node may determine QoS of the first target service (that is, QoS of the first uplink information), where in this embodiment of the present invention, the QoS may include a priority of the service (specifically, a priority of the first target service among all services transmitted by using the first network node) and bit rate requirement information of the service. If the first target service has a relatively high priority, the first network node may allocate a relatively large quantity of radio resource (uplink transmission resources) to the user equipment, to ensure that the QoS of the user equipment is satisfied. Similarly, if the first target service has a relatively high bit rate requirement, the first network node may allocate a relatively large quantity of radio resources (uplink transmission resources) to the user equipment.

It should be understood that, in this embodiment of the present invention, parameters (a data volume, a transmission rate requirement, maximum tolerable delay, a transmission channel status, QoS of uplink information, and a load status of a network node) included in the transmission requirement may be used independently, or may be used in a combination manner, which is not specially limited in the present invention.

It should be understood that, the foregoing listed method of using the data transmission requirement of the first uplink information is merely exemplary. For example, in a case in which a volume of a radio resource used for uplink transmission is fixed (for example, the first uplink information and the second uplink information are carried in a same carrier), after the radio resource used for transmitting the first uplink information is determined according to the data transmission requirement of the first uplink information, the radio resource used for transmitting the second uplink information may be further determined.

3. Data Transmission Requirement of the Second Uplink Information

Optionally, the determining, by the first network node, a second radio resource includes:

acquiring, by the first network node, auxiliary information from the second network node, where the auxiliary information is used to indicate a transmission requirement of the second uplink information, and/or the second radio resource, where the second radio resource is determined by the second network node according to the transmission requirement of the second uplink information, and the transmission requirement of the second uplink information includes at least one of the following parameters: the data volume of the second uplink information, the transmission rate requirement of the second uplink information, the maximum tolerable delay of the second uplink information, the transmission channel status of the second uplink information, the QoS of the second uplink information, and the load status of the second network node; and determining, by the first network node, the second radio resource according to the auxiliary information.

Specifically, in this embodiment of the present invention, the data transmission requirement of the second uplink information may be used to determine the radio resource used for transmitting the second uplink information, and a method of using the data transmission requirement of the second uplink information is similar to of the method of using the data transmission requirement of the first uplink information. Herein, descriptions are omitted to avoid repetition.

In addition, for example, in a case in which a volume of a radio resource used for uplink transmission is fixed (for example, the first uplink information and the second uplink information are carried in a same carrier), after the radio resource used for transmitting the second uplink information is determined according to the data transmission requirement of the second uplink information, the radio resource used for transmitting the first uplink information may be further determined.

It should be noted that, an action and a process of determining, according to the data transmission requirement of the second uplink information, the radio resource used for transmitting the second information may be performed by the second network node, or may be performed by the first network node, which is not specially limited in the present invention.

Optionally, before the receiving, by the first network node, auxiliary information sent by the second network node, the method further includes:

sending, by the first network node, first request information to the second network node, so that the second network node sends the auxiliary information to the first network node according to the first request information.

Specifically, in this embodiment of the present invention, the first network node may actively send a request (that is, the first request information) to the second node, to trigger the second network node to acquire the auxiliary information and send the auxiliary information to the first network node.

After receiving the first request information, the second network node may acquire the transmission requirement of the second uplink information.

Then, the second network node may directly send the transmission requirement (an example of the auxiliary information) of the second uplink information to the first network node, so that the first network node determines the second radio resource according to the transmission requirement of the second uplink information.

Alternatively, the second network node may determine a suggested second radio resource (another example of the auxiliary information) according to the transmission requirement of the second uplink information, and send the suggested second radio resource to the first network node, so that the first network node uses the second radio resource suggested by the second network node.

According to the information transmission method provided in this embodiment of the present invention, the radio resource used for uplink transmission is determined according to the transmission requirement of the second uplink information, which can adapt to a transmission environment and a data volume between the user equipment and the second network node, further improve the transmission effect, and improve practicality of the present invention.

Optionally, the method further includes:

sending, by the first network node, sub-uplink transmission configuration information to the second network node, where the sub-uplink transmission configuration information is used to instruct the second network node to receive, by using the second radio resource, the second uplink information sent by the user equipment.

Specifically, after the first network node determines the second radio resource according to the auxiliary information from the second network node, the first network node may send information (that is, the sub-uplink transmission configuration information) indicating the second radio resource to the second network node.

It should be noted that, when the auxiliary information is the transmission requirement of the second uplink information, the sub-uplink transmission configuration information may be all of the uplink transmission information (the uplink transmission information is described in detail subsequently) sent to the user equipment by the first network node, or may be a part, corresponding to the second radio resource, of the uplink transmission information.

When the auxiliary information is a second radio resource suggested by the second network node, and the first network node uses the suggested second radio resource, the sub-uplink transmission configuration information may be an acknowledgement identifier, indicating that the first network node uses the second radio resource suggested by the second network node.

Therefore, the second network node may receive, by using the second radio resource according to the sub-uplink transmission configuration information, the second uplink information sent by the user equipment. For example, when the second radio resource is a time domain resource, the second network node can, for example, enable a transceiver according to a period (a second period) corresponding to the time domain resource, to receive the second uplink information sent by the user equipment.

For another example, when the second radio resource is a frequency domain resource, the second network node can detect only a frequency band (a second frequency band) corresponding to the frequency domain resource, to receive the second uplink information sent by the user equipment.

According to the information transmission method provided in this embodiment of the present invention, the second network node may receive, according to the sub-uplink transmission configuration information, the second uplink information sent by the user equipment, which can reduce power consumption of the second network node, and implement energy conservation and environment protection.

Optionally, before the sending, by the first network node, uplink transmission configuration information to the user equipment, the method further includes:

receiving, by the first network node, first acknowledgement information sent by the second network node, where the first acknowledgement information is sent by the second network node after the second network node receives the sub-uplink transmission configuration information; and determining, by the first network node according to the first acknowledgement information, that the second network node can receive, according to the sub-uplink transmission configuration information, the second uplink information sent by the user equipment.

Specifically, after the second network node receives the sub-uplink transmission configuration information and determines the second radio resource, the second network node may send an acknowledgement identifier (the first acknowledgement information) to the first network node, to indicate that the second network node can receive, according to configuration of the second radio resource, the second uplink information sent by the user equipment. After receiving the acknowledgement identifier, the first network node may send the uplink transmission configuration information to the user equipment.

According to the information transmission method provided in this embodiment of the present invention, after receiving the sub-uplink transmission configuration information, the second network node sends acknowledgement information to the first network node, which can improve reliability of transmission of the second uplink information.

Optionally, the determining, by the first network node, a second radio resource includes:

receiving, by the first network node, second request information sent by the second network node; and determining, by the first network node, the second radio resource according to the second request information.

Specifically, in this embodiment of the present invention, when the second network node needs to transmit information (for example, the second uplink information) with the user equipment, the second network node may actively send a request (the second request information) to the first network node. Therefore, the first network node may trigger processes of the method 100 according to the request of the second network node.

It should be noted that, in this embodiment of the present invention, the second network node may send the second request information and the auxiliary information to the first network node at the same time, or may send the auxiliary information to the first network node after sending the second request information, which is not specially limited in the present invention.

According to the information transmission method provided in this embodiment of the present invention, after receiving the second request information sent by the second network node, the first network node triggers subsequent processes, which can flexibly adapt to the transmission requirement of the second network node, and improve practicality of the present invention.

Optionally, the first radio resource corresponds to a first frequency band, and the first frequency band is a frequency band used to transmit the first uplink information between the user equipment and the first network node; the second radio resource corresponds to the second frequency band, and the second period is a frequency band used to transmit the second uplink information between the user equipment and the second network node; and the first frequency band and the second frequency band belong to a same carrier.

Specifically, in this embodiment of the present invention, in the communications system, the user equipment may perform uplink communication with the network nodes (including the first network node and the second network node) by using one carrier; in this case, the first radio resource and the second radio resource may be two different frequency bands (that is, the first frequency band and the second frequency band) in the carrier, where the first frequency band carries the first uplink information that the user equipment needs to send to the first network node and the second frequency band carries the second uplink information that the user equipment needs to send to the second network node. In addition, in this case, the uplink transmission configuration information may indicate a specific range of the first frequency band and a specific range of the second frequency band.

According to the information transmission method provided in this embodiment of the present invention, the first radio resource and the second radio resource are different frequency bands in the uplink carrier, so that the user equipment can send the uplink information to the first network node and the second network node at the same time. Therefore, the user equipment can complete sending of all uplink information by setting only one sending device, which saves device costs.

Optionally, the first radio resource corresponds to a first period, and the first period is a period for transmitting the first uplink information between the user equipment and the first network node; and the second radio resource corresponds to a second period, and the second period is a period for transmitting the second uplink information between the user equipment and the second network node.

Specifically, in this embodiment of the present invention, in the communications system, the user equipment may separately perform uplink communication with the network nodes in the system in different periods; in this case, the first radio resource and the second radio resource may be resources in two different periods (that is, the first period and the second period), the user equipment sends the first uplink information to the first network node in the first period and the user equipment sends the second uplink information to the second network node in the second period. In addition, in this case, the uplink transmission configuration information may indicate a specific range of the first period and a specific range of the second period.

Optionally, when the user equipment can send the uplink information to the first network node and the second network node by using at least two uplink carriers, the first period is specifically a period in which the user equipment sends the first uplink information to the first network node by using a first uplink carrier and the second period is specifically a period in which the user equipment sends the second uplink information to the second network node by using a second uplink carrier, where the first uplink carrier is different from the second uplink carrier.

Specifically, in this embodiment of the present invention, in the communications system, the user equipment may perform uplink communication with the network nodes (including the first network node and the second network node) by using multiple carriers, and in addition, the user equipment may separately perform uplink communication with the network nodes in the system in different periods; in this case, the first radio resource and the second radio resource may be different carriers (that is, the first uplink carrier and the second uplink carrier) in two different periods (that is, the first period and the second period). The user equipment sends the first uplink information to the first network node by using the first uplink carrier in the first period and the user equipment sends the second uplink information to the second network node by using the second uplink carrier in the second period. In addition, in this case, the uplink transmission configuration information may indicate the specific range of the first period, the specific range of the second period, a first carrier (for example, a carrier number of the first carrier) used in the first period, and a second carrier (for example, a carrier number of the second carrier) used in the second period.

According to the information transmission method provided in this embodiment of the present invention, the first radio resource and the second radio resource are different carriers used for sending in different periods, so that the user equipment can send the uplink information to the first network node and the second network node by using different carriers in different periods, which improves a capacity of uplink information and can adapt to transmission of massive uplink information.

Optionally, when the user equipment can send the uplink information to the first network node and the second network node by using one uplink carrier, the first period corresponds to at least one first uplink subframe of the uplink carrier and the second period corresponds to at least one second uplink subframe of the uplink carrier, where the first uplink subframe is different from the second uplink subframe.

Specifically, in this embodiment of the present invention, for example, in a case in which the first uplink information is feedback information of the first downlink information and the second uplink information is feedback information of the second downlink information, a mapping relationship exists between a transmission period of the uplink information and a transmission period of corresponding downlink information.

Optionally, the uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

Specifically, in this case, the first network node may notify the user equipment of the first radio resource and the second radio resource by indicating a correspondence between an uplink data frame and a downlink data frame.

For example, the first network node may determine an uplink period (which is specifically an uplink data frame), so that the user equipment transmits, in an uplink data frame following a downlink data frame from a network node, uplink information needing to be sent to the network node.

For another example, the first downlink information is carried in at least two continuous or discontinuous subframes in the first downlink carrier, and/or the second downlink information is carried in at least two continuous or discontinuous subframes in the second downlink carrier.

That is, the first network node may determine an uplink period (which is specifically an uplink data frame), so that the user equipment transmits, in an uplink data frame following multiple downlink data frames from a network node, uplink information needing to be sent to the network node.

Optionally, the uplink transmission configuration information is specifically used to indicate a location of the first downlink subframe of the first downlink carrier and a time interval between the first uplink subframe and the first downlink subframe; and the uplink transmission configuration information is specifically used to indicate a location of the second downlink subframe of the second downlink carrier and a time interval between the second uplink subframe and the second downlink subframe.

Specifically, FIG. 3a is a schematic diagram of the uplink transmission configuration information according to an embodiment of the present invention. As shown in FIG. 3a, an example in which downlink information is data (data of an HARQ) from a network node and uplink information is ACK/NACK information (ACK/NACK information of the HARQ) is used. For example, the first network node may determine: ACK/NACK information (an example of the first uplink information) of data (an example of the first downlink information), from the first network node, carried in a subframe #0 to a subframe #1 of a first downlink carrier is carried in a subframe #5 of an uplink carrier; ACK/NACK information (an example of the second uplink information) of data (an example of the second downlink information), from a second network node, carried in a subframe #0 to a subframe #1 of a second downlink carrier is carried in a subframe #6 of the uplink carrier; ACK/NACK information of data, from the first network node, carried in a subframe #2 to a subframe #3 of the first downlink carrier is carried in a subframe #7 of the uplink carrier; ACK/NACK information of data, from the second network node, carried in a subframe #2 to a subframe #3 of the second downlink carrier is carried in a subframe #8 of the uplink carrier; ACK/NACK information of data, from the first network node, carried in a subframe #4 to a subframe #5 of the first downlink carrier is carried in a subframe #9 of the uplink carrier; ACK/NACK information of data, from the second network node, carried in a subframe #4 to a subframe #5 of the second downlink carrier is carried in a subframe #10 of the uplink carrier; ACK/NACK information of data, from the first network node, carried in a subframe #6 to a subframe #7 of the first downlink carrier is carried in a subframe #11 of the uplink carrier; ACK/NACK information of data, from the second network node, carried in a subframe #6 to a subframe #7 of the second downlink carrier is carried in a subframe #12 of the uplink carrier; ACK/NACK information of data, from the first network node, carried in a subframe #8 to a subframe #9 of the first downlink carrier is carried in a subframe #13 of the uplink carrier; ACK/NACK information of data, from the second network node, carried in a subframe #8 to a subframe #9 of the second downlink carrier is carried in a subframe #14 of the uplink carrier; ACK/NACK information of data, from the first network node, carried in a subframe #10 to a subframe #11 of the first downlink carrier is carried in a subframe #15 of the uplink carrier; and ACK/NACK information of data, from the second network node, carried in a subframe #10 to a subframe #11 of the second downlink carrier is carried in a subframe #16 of the uplink carrier.

It should be understood that, the foregoing listed correspondence between a radio resource (which is specifically an uplink subframe) used to transmit the uplink information and a radio resource (which is specifically a downlink subframe) used to transmit downlink information is merely exemplary, and the present invention is not limited thereto.

For example, a quantity (or a quantity of downlink subframes to which the uplink subframe can correspond) of ACK/NACK information carried in subframes in the uplink carrier may be set freely. In the foregoing embodiment, one uplink subframe carries feedback information of data carried in two downlink subframes. However, the present invention is not limited thereto, for example, a quantity (or a quantity of corresponding downlink subframes) of feedback information that can be carried may be determined according to available resources in a subframe and a volume of feedback information.

For another example, quantities (or quantities of downlink subframes to which the uplink subframes can correspond) of ACK/NACK information aggregated in the subframes in the uplink carrier may be different, for example, one uplink subframe may carry feedback information of data carried in three downlink subframes and another uplink subframe may carry feedback information of data carried in two downlink subframes.

For another example, an interval between a downlink subframe and a corresponding uplink subframe may be set freely. In the foregoing embodiment, for the first network node, ACK/NACK information of data in a downlink subframe is transmitted in the fifth uplink subframe following the subframe, that is, the user equipment receives downlink information in a subframe n and sends feedback in a subframe n+5. However, the present invention is not limited thereto, the user equipment may also send feedback in a subframe n+4, a subframe n+6, or a subframe n+8 following the downlink subframe n.

Figure 3B:
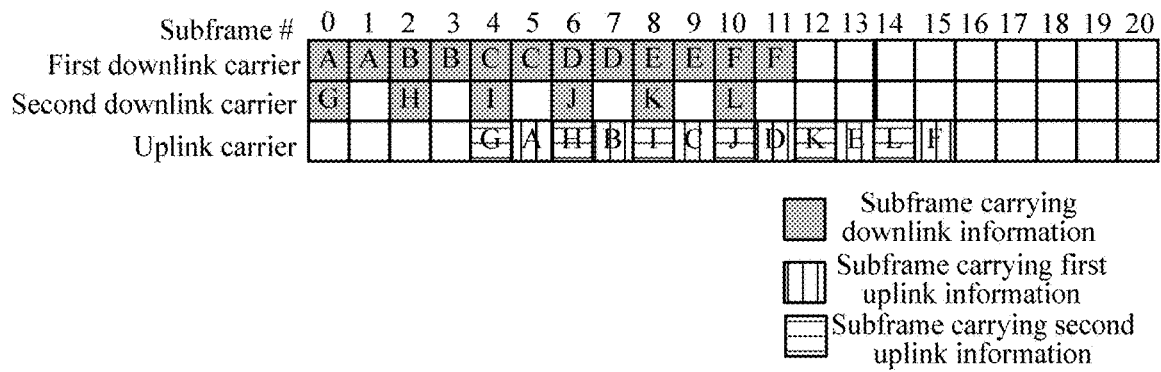
FIG. 3b is a schematic diagram of uplink transmission configuration information according to another embodiment of the present invention.

FIG. 3b is a schematic diagram of the uplink transmission configuration information according to another embodiment of the present invention. In FIG. 3a, configuration of a downlink subframe in the first network node is the same as configuration of a downlink subframe in the second network node; on the contrary, in FIG. 3b, configuration of a downlink subframe in the first network node is different from configuration of a downlink subframe in the second network node. The second network node sends downlink information in a specified downlink subframe, for example, a subframe #0, a subframe #2, a subframe #4, a subframe #6, a subframe #8, or a subframe #10. In addition, in FIG. 3a, for the second network node, after receiving the downlink information in a subframe #n, the user equipment feeds back uplink information in a subframe #n+6; in FIG. 3b, after receiving the downlink information in the subframe #n, the user equipment feeds back uplink information in a subframe #n+4.

It should be understood that, the foregoing listed form of the uplink transmission configuration information is merely exemplary, and the present invention is not limited thereto. For example, the uplink transmission configuration information may also indicate a subframe number of a downlink subframe and an interval between an uplink subframe for sending feedback for the downlink subframe and the downlink subframe.

Optionally, the uplink transmission configuration information is specifically used to indicate a location of the first uplink subframe of the uplink carrier and a location of the second uplink subframe of the uplink carrier.

Specifically, in this embodiment of the present invention, the uplink transmission configuration information may indicate a subframe number of an uplink subframe for each network node.

Optionally, a guard period is set between the first period and the second period, so that the user equipment performs conversion processing between transmission of the first uplink information and transmission of the second uplink information in the guard period.

Figure 3C:
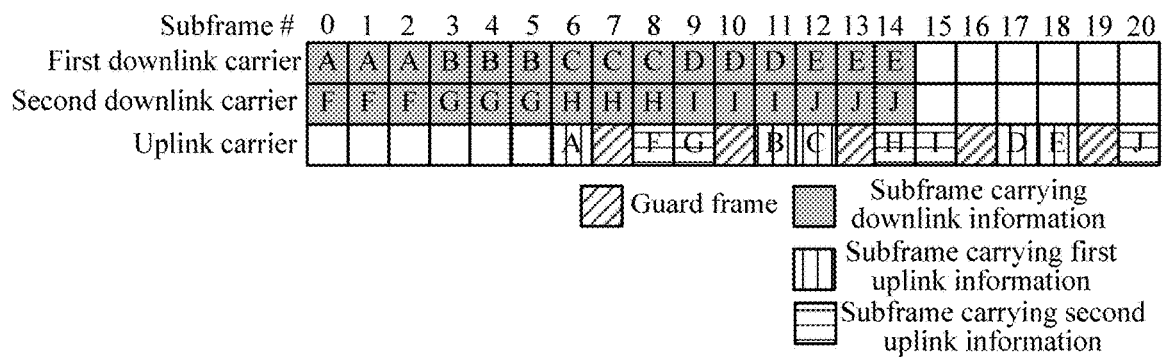
FIG. 3c is a schematic diagram of uplink transmission configuration information according to still another embodiment of the present invention.

Specifically, FIG. 3c is a schematic diagram of the uplink transmission configuration information according to still another embodiment of the present invention. As shown in FIG. 3c, an example in which downlink information is data (of an HARQ) from a network node and uplink information is ACK/NACK information of the data is used. For example, the first network node may determine: ACK/NACK information (an example of the first uplink information) of data (an example of the first downlink information), from the first network node, carried in a subframe #0 to a subframe #2 of a first downlink carrier is carried in a subframe #6 of an uplink carrier; ACK/NACK information (an example of the second uplink information) of data (an example of the second downlink information), from the second network node, carried in a subframe #0 to a subframe #2 of a second downlink carrier is carried in a subframe #8 of the uplink carrier; ACK/NACK information of data, from the first network node, carried in a subframe #3 to a subframe #5 of the first downlink carrier is carried in a subframe #11 of the uplink carrier; ACK/NACK information of data, from the second network node, carried in a subframe #3 to a subframe #5 of the second downlink carrier is carried in a subframe #9 of the uplink carrier; ACK/NACK information of data, from the first network node, carried in a subframe #6 to a subframe #8 of the first downlink carrier is carried in a subframe #12 of the uplink carrier; ACK/NACK information of data, from the second network node, carried in a subframe #6 to a subframe #8 of the second downlink carrier is carried in a subframe #14 of the uplink carrier; ACK/NACK information of data, from the first network node, carried in a subframe #9 to a subframe #11 of the first downlink carrier is carried in a subframe #17 of the uplink carrier; ACK/NACK information of data, from the second network node, carried in a subframe #9 to a subframe #11 of the second downlink carrier is carried in a subframe #15 of the uplink carrier; ACK/NACK information of data, from the first network node, carried in a subframe #12 to a subframe #14 of the first downlink carrier is carried in a subframe #18 of the uplink carrier; ACK/NACK information of data, from the second network node, carried in a subframe #12 to a subframe #14 of the second downlink carrier is carried in a subframe #20 of the uplink carrier. In addition, a guard frame (an example of the guard period) (for example, a length is one frame), that is, a subframe #7, is set between the subframe #6 and the subframe #8 of the uplink carrier, so that the user equipment may perform conversion processing in the subframe #7, to convert sending processing to the first network node to sending processing to the second network node. Similarly, a subframe #10 is set between the subframe #9 and the subframe #11 of the uplink carrier and is used as a guard frame; a subframe #13 is set between the subframe #12 and the subframe #14 of the uplink carrier and is used as a guard frame; a subframe #16 is set between the subframe #15 and the subframe #17 of the uplink carrier and is used as a guard frame; and a subframe #19 is set between the subframe #18 and the subframe #20 of the uplink carrier and is used as a guard frame.

Herein, in the description of the sub-uplink configuration information, in this embodiment of the present invention, the first network node may use the uplink transmission configuration information shown in FIG. 3a to FIG. 3c as the sub-uplink transmission configuration information and send the sub-uplink transmission configuration information to the second network node, or the first network node may also use a part, related to only the second network node, of the uplink configuration information shown in FIG. 3a to FIG. 3c as the sub-uplink configuration information and send the sub-uplink configuration information to the second network node.

It should be noted that, in FIG. 3a to FIG. 3c, for downlink information carried in downlink subframes marked with a same letter, feedback is sent in uplink subframes marked with the letter. For example, in FIG. 3a, for downlink information carried in a subframe #0 and a subframe #1 that are marked with A of the first downlink carrier, feedback is sent in a subframe #5 marked with A of the uplink carrier.

In S120, the first network node sends the foregoing determined uplink transmission configuration information to the user equipment.

Optionally, the sending, by the first network node, the uplink transmission configuration information to the user equipment includes:

adding, by the first network node, the uplink transmission configuration information to at least one type of the following information and sending the at least one type of the following information to the user equipment:

a broadcast message, a Radio Resource Control (RRC) message, a Medium Access Control control element (MAC CE), and a physical layer command.

Therefore, new transmission signaling and messages are not needed, and practicality of the present invention can be improved.

Therefore, the user equipment may determine, according to the uplink transmission configuration information, a resource (the first radio resource) used to transmit the first uplink information to the first network node and a resource (the second radio resource) used to transmit the second uplink information to the second network node.

Optionally, the receiving, by the first network node, the first uplink information sent by the user equipment includes:

receiving, by the first network node, second acknowledgement information sent by the user equipment; and receiving, by the first network node in accordance with the second acknowledgement information, the first uplink information sent by the user equipment.

Specifically, after the user equipment receives the uplink transmission configuration information and determines the first radio resource and the second radio resource, the user equipment may send an acknowledgement identifier (second acknowledgement information) to the first network node, to indicate that the user equipment can transmit the first uplink information to the first network node by using the first radio resource according to the uplink transmission configuration information and transmit the second uplink information to the second network node by using the second radio resource according to the uplink transmission configuration information.

According to the information transmission method provided in this embodiment of the present invention, after receiving the uplink transmission configuration information, the user equipment sends acknowledgement information to the first network node, which can improve reliability of transmission of the uplink information.

Optionally, before the receiving, by the first network node, the first uplink information sent by the user equipment, the method further includes:

sending, by the first network node, triggering information to the user equipment, so that the user equipment sends the uplink information to the first network node and the second network node according to the triggering information and the uplink transmission configuration information.

Specifically, in this embodiment of the present invention, when the first network node needs to schedule the user equipment (for example, needs to send data to the user equipment and acquire feedback from the user equipment, such as ACK/NACK information of an HARQ), the first network node may send triggering information to the user equipment, to instruct the user equipment to start performing uplink transmission according to the foregoing determined uplink transmission configuration information. It should be noted that, the triggering information may be directly sent to the user equipment by the first network node, or may be first sent to the second network node by the first network node and then is sent to the user equipment by the second network node, which is not specially limited in the present invention.

Optionally, the receiving, by the first network node, the first uplink information sent by the user equipment includes:

receiving, by the first network node according to the transmission configuration information, the first uplink information sent by the user equipment.

Specifically, in this embodiment of the present invention, the first network node may receive, by using the first radio resource according to the uplink transmission configuration information (which is specifically a part, related to the first network node, of the uplink transmission configuration information), the first uplink information sent by the user equipment. For example, when the first radio resource is a time domain resource, the first network node can, for example, enable a transceiver according to a period (the first period) corresponding to the time domain resource, to receive the first uplink information sent by the user equipment.

In addition, when the first radio resource is a frequency domain resource, the first network node can detect only a frequency band (a first frequency band) corresponding to the frequency domain resource, to receive the first uplink information sent by the user equipment.

According to the information transmission method provided in this embodiment of the present invention, the first network node may receive, according to the uplink transmission configuration information, the first uplink information sent by the user equipment, which can reduce power consumption of the first network node, and implement energy conservation and environment protection.

Figure 4:
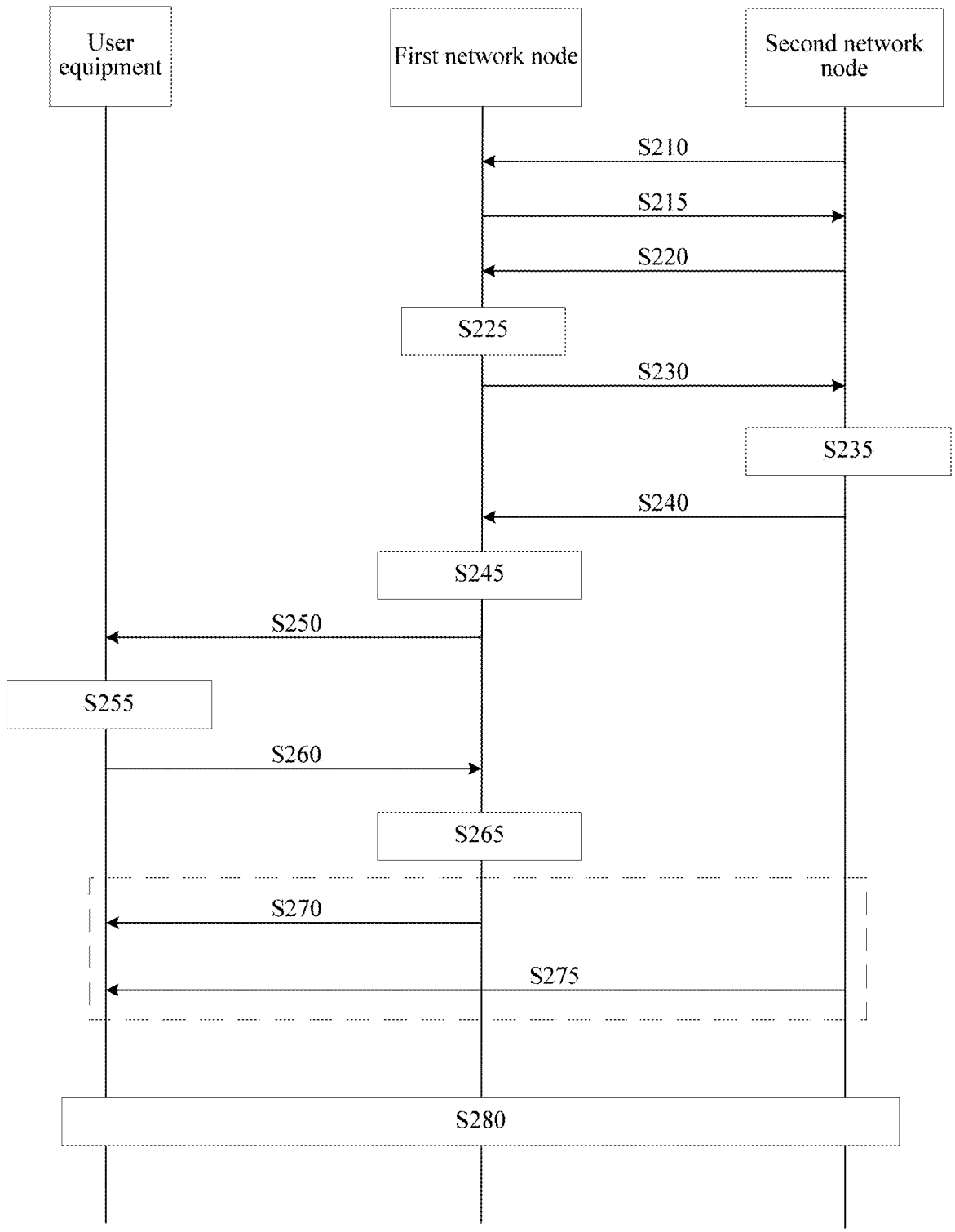
FIG. 4 is a schematic diagram of interaction in an information transmission method according to an embodiment of the present invention.

FIG. 4 is a schematic diagram of interaction in an information transmission method according to an embodiment of the present invention. As shown in FIG. 4:

In S210, a second network node sends second request information to a first network node, to trigger the first network node to perform a process of determining an uplink transmission resource.

In S215, the first network node sends first request information to the second network node.

In S220, the second network node sends auxiliary information to the first network node (according to the first request information).

In S225, the first network node determines a first radio resource and a second radio resource (according to the auxiliary information determined in S230, QoS of a current service of user equipment, and at least one parameter of a transmission requirement of first uplink information).

In S230, the first network node sends sub-uplink configuration information to the second network node.

In S235, the second network node determines, according to the sub-uplink configuration information, to receive, by using the second radio resource, second uplink information sent by the user equipment.

In S240, the second network node sends first acknowledgement information to the first network node.

In S245, the first network node determines, according to the first acknowledgement information, that the second network node can receive, by using the second radio resource, the second uplink information sent by the user equipment.

In S250, the first network node sends uplink configuration information to the user equipment.

In S255, the user equipment determines, according to the uplink configuration information, to send the first uplink information to the first network node by using the first radio resource and send the second uplink information to the second network node by using the second radio resource.

In S260, the user equipment sends second acknowledgement information to the first network node.

In S265, the first network node determines, according to the second acknowledgement information, that the user equipment can send the first uplink information to the first network node by using the first radio resource and send the second uplink information to the second network node by using the second radio resource.

In S270, the first network node sends triggering information to the user equipment.

Alternatively, in S275, the second network node sends triggering information to the user equipment.

In S280, after receiving the triggering information, the user equipment sends the first uplink information to the first network node by using the first radio resource according to the uplink configuration information, and sends the second uplink information to the second network node by using the second radio resource according to the uplink configuration information.

According to the information transmission method provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node first for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

FIG. 5 is a schematic flowchart of an information transmission method 300 described from the perspective of a second network node (for example, a base station of a secondary cell or a secondary base station). As shown in FIG. 5, the method 300 includes:

S320: The second network node receives second uplink information sent by user equipment, where the second uplink information is sent by the user equipment according to uplink transmission configuration information, and the uplink configuration information is used to indicate a first radio resource and a second radio resource that are different from each other, where the first radio resource is a resource used for transmitting first uplink information between the user equipment and a first network node and the second radio resource is a resource used for transmitting the second uplink information between the user equipment and the second network node.

Specifically, the first network node may determine a radio resource used by the user equipment to transmit uplink information, where the radio resource may include a radio resource (the first radio resource) used for communication between the user equipment and the first network node and a radio resource (the second radio resource) used for communication between the user equipment and the second network node. In this embodiment of the present invention, the first network node can send first downlink information to the user equipment by using at least one first downlink carrier, and the second network node in at least two network nodes can send second downlink information to the user equipment by using at least one second downlink carrier. In addition, downlink carriers (or carrier frequencies) used by the at least two network nodes to send the downlink information to the user equipment may be different. Therefore, the network devices may send the downlink information to the user equipment at the same time, which improves a downlink throughput of a communications system. In this embodiment of the present invention, the downlink information may be information that requires feedback, for example, by means of a hybrid automatic repeat request (HARQ) or the like, by the user equipment, so that the network node executes resource scheduling according to the feedback. In this case, the uplink information may be feedback information of the downlink information, for example, may be acknowledgement (ACK) information or negative acknowledgement (NACK) information of the HARQ. In addition, the first uplink information includes at least one type of the following information: physical uplink control channel information, physical uplink shared channel information, and an uplink reference signal and the second uplink information includes at least one type of the following information: physical uplink control channel information, physical uplink shared channel information, and an uplink reference signal, where the physical uplink control channel information includes at least one type of the following information: acknowledgement (ACK) information of a hybrid automatic repeat request (HARQ), negative acknowledgement (NACK) information of the HARQ, and scheduling request information; and the physical uplink shared channel information includes at least one type of the following information: retransmitted uplink data and newly-transmitted uplink data.

In this embodiment of the present invention, the first network node may determine, according to at least one parameter of quality of service (QoS) of a current service of the user equipment, a data transmission requirement of the first uplink information, and a data transmission requirement of the second uplink information, a radio resource used for communication (uplink communication) between the user equipment and the first network node and a radio resource used for communication (uplink communication) between the user equipment and the second network node. It should be understood that, the three listed parameters may be used independently, or may be used in a combination manner, which is not specially limited in the present invention.

Optionally, before the receiving, by the second network node, second uplink information sent by user equipment, the method further includes:

S310: The second network node sends auxiliary information to the first network node, where the auxiliary information is used to indicate a transmission requirement of the second uplink information, so that the first network node determines the second radio resource according to the auxiliary information, where the transmission requirement of the second uplink information includes at least one of the following parameters:

a data volume of the second uplink information, a transmission rate requirement of the second uplink information, a maximum tolerable delay of the second uplink information, a transmission channel status of the second uplink information, QoS of the second uplink information, and a load status of the second network node.

Alternatively, before the receiving, by the second network node, second uplink information sent by user equipment, the method further includes:

S315: The second network node determines the second radio resource according to a transmission requirement of the second uplink information, where the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node.

S317: The second network node sends auxiliary information to the first network node, where the auxiliary information is used to indicate the second radio resource.

According to the information transmission method provided in this embodiment of the present invention, the radio resource used for uplink transmission is determined according to the transmission requirement of the second uplink information, which can adapt to a transmission environment and a data volume between the user equipment and the second network node, further improve the transmission effect, and improve practicality of the present invention.

In addition, after the first network node determines the second radio resource according to the auxiliary information from the second network node, the first network node may send information (that is, the sub-uplink transmission configuration information) indicating the second radio resource to the second network node.

It should be noted that, when the auxiliary information is the transmission requirement of the second uplink information, the sub-uplink transmission configuration information may be all of the uplink transmission information (the uplink transmission information is described in detail subsequently) sent to the user equipment by the first network node, or may be a part, corresponding to the second radio resource, of the uplink transmission information.

When the auxiliary information is a second radio resource suggested by the second network node, and the first network node uses the suggested second radio resource, the sub-uplink transmission configuration information may be an acknowledgement identifier, indicating that the first network node uses the second radio resource suggested by the second network node.

Therefore, the second network node may determine the second radio resource according to the sub-uplink transmission configuration information. When the second radio resource is a time domain resource, the second network node can, for example, enable a transceiver according to a period (a second period) corresponding to the time domain resource, to receive the second uplink information sent by the user equipment. In addition, when the second radio resource is a frequency domain resource, the second network node can detect only a frequency band (a second frequency band) corresponding to the frequency domain resource, to receive the second uplink information sent by the user equipment.

According to the information transmission method provided in this embodiment of the present invention, the second network node may receive, according to the sub-uplink transmission configuration information, the second uplink information sent by the user equipment, which can reduce power consumption of the second network node, and implement energy conservation and environment protection.

After the second network node receives the sub-uplink transmission configuration information and determines the second radio resource, the second network node may send an acknowledgement identifier (the first acknowledgement information) to the first network node, to indicate that the second network node can receive, according to configuration of the second radio resource, the second uplink information sent by the user equipment. After receiving the acknowledgement identifier, the first network node may send the uplink transmission configuration information to the user equipment.

According to the information transmission method provided in this embodiment of the present invention, after receiving the sub-uplink transmission configuration information, the second network node sends acknowledgement information to the first network node, which can improve reliability of transmission of the second uplink information.

In addition, in this embodiment of the present invention, when the second network node needs to transmit information (for example, the second uplink information) with the user equipment, the second network node may actively send a request (the second request information) to the first network node. Therefore, the first network node may trigger processes of the method 100 according to the request of the second network node.

According to the information transmission method provided in this embodiment of the present invention, after receiving the second request information sent by the second network node, the first network node triggers subsequent processes, which can flexibly adapt to the transmission requirement of the second network node, and improve practicality of the present invention.

Optionally, the first radio resource corresponds to a first frequency band, and the first frequency band is a frequency band used to transmit the first uplink information between the user equipment and the first network node; the second radio resource corresponds to a second frequency band, and the second period is a frequency band used to transmit the second uplink information between the user equipment and the second network node; and the first frequency band and the second frequency band belong to a same carrier.

According to the information transmission method provided in this embodiment of the present invention, the first radio resource and the second radio resource are different frequency bands in the uplink carrier, so that the user equipment can send the uplink information to the first network node and the second network node at the same time. Therefore, the user equipment can complete sending of all uplink information by setting only one sending device, which saves device costs.

Optionally, the first radio resource corresponds to a first period, and the first period is a period for transmitting the first uplink information between the user equipment and the first network node; and the second radio resource corresponds to a second period, and the second period is a period for transmitting the second uplink information between the user equipment and the second network node.

In addition, when the user equipment can send the uplink information to the first network node and the second network node by using at least two uplink carriers, the first period is specifically a period in which the user equipment sends the first uplink information to the first network node by using a first uplink carrier and the second period is specifically a period in which the user equipment sends the second uplink information to the second network node by using a second uplink carrier.

According to the information transmission method provided in this embodiment of the present invention, the first radio resource and the second radio resource are different carriers used for sending in different periods, so that the user equipment can send the uplink information to the first network node and the second network node by using different carriers in different periods, which improves a capacity of uplink information and can adapt to transmission of massive uplink information.

Optionally, when the user equipment can send the uplink information to the first network node and the second network node by using one uplink carrier, the first period corresponds to at least one first uplink subframe of the uplink carrier and the second period corresponds to at least one second uplink subframe of the uplink carrier, where the first uplink subframe is different from the second uplink subframe.

In addition, the sub-uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

In addition, the sub-uplink transmission configuration information is specifically used to indicate a location of the second downlink subframe of the second downlink carrier and a time interval between the second uplink subframe and the second downlink subframe.

In this embodiment of the present invention, the first network node may add the foregoing determined uplink transmission configuration information to a Radio Resource Control (RRC) message, a Medium Access Control control element (MAC CE), or a physical command and send the Radio Resource Control message, the Medium Access Control control element, or the physical command to the user equipment. Therefore, new transmission signaling and messages are not needed, and practicality of the present invention can be improved.

Therefore, the user equipment may determine, according to the uplink transmission configuration information, a resource (the first radio resource) used to transmit the first uplink information to the first network node and a resource (the second radio resource) used to transmit the second uplink information to the second network node.

Thereafter, the user equipment may send an acknowledgement identifier (second acknowledgement information) to the first network node, to indicate that the user equipment can transmit the first uplink information to the first network node by using the first radio resource according to the uplink transmission configuration information and transmit the second uplink information to the second network node by using the second radio resource according to the uplink transmission configuration information.

According to the information transmission method provided in this embodiment of the present invention, after receiving the uplink transmission configuration information, the user equipment sends acknowledgement information to the first network node, which can improve reliability of transmission of the uplink information.

Optionally, before the receiving, by the second network node, second uplink information sent by user equipment, the method further includes:

sending, by the second network node, triggering information to the user equipment, so that the user equipment sends the uplink information to the first network node and the second network node according to the triggering information and the uplink transmission configuration information.

Specifically, in this embodiment of the present invention, when the second network node needs to schedule the user equipment (for example, needs to send an HARQ to the user equipment and acquire feedback from the user equipment), the second network node may send triggering information to the user equipment, to instruct the user equipment to start performing uplink transmission according to the foregoing determined uplink transmission configuration information. It should be noted that, the triggering information may be directly sent to the user equipment by the second network node, or may be first sent to the first network node by the second network node and then is sent to the user equipment by the first network node, which is not specially limited in the present invention.

According to the information transmission method provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node first for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

FIG. 6 is a schematic flowchart of an information transmission method 400 described from the perspective of user equipment. As shown in FIG. 6, the method 400 includes:

S410: The user equipment receives uplink transmission configuration information sent by a first network node, where the uplink configuration information is used to indicate a first radio resource and a second radio resource that are different from each other, where the first radio resource is a resource used for transmitting first uplink information between the user equipment and the first network node and the second radio resource is a resource used for transmitting second uplink information between the user equipment and a second network node.

S420: The user equipment sends the first uplink information to the first network node by using the first radio resource according to the uplink transmission configuration information and sends the second uplink information to the second network node by using the second radio resource according to the uplink transmission configuration information.

Specifically, the first network node may determine a radio resource used by the user equipment to transmit uplink information, where the radio resource may include a radio resource (the first radio resource) used for communication between the user equipment and the first network node and a radio resource (the second radio resource) used for communication between the user equipment and the second network node. It should be noted that, in this embodiment of the present invention, the radio resource may include a time domain resource and/or a frequency domain resource. In addition, in this embodiment of the present invention, the first network node can send first downlink information to the user equipment by using at least one first downlink carrier, and the second network node in at least two network nodes can send second downlink information to the user equipment by using at least one second downlink carrier.

Optionally, the first radio resource and the second radio resource are determined according to at least one type of the following information:

quality of service (QoS) of a current service of the user equipment, a data transmission requirement of the first uplink information, and a data transmission requirement of the second uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node; and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node.

Optionally, the first radio resource corresponds to a first frequency band, and the first frequency band is a frequency band used to transmit the first uplink information between the user equipment and the first network node; the second radio resource corresponds to a second frequency band, and the second period is a frequency band used to transmit the second uplink information between the user equipment and the second network node; and the first frequency band and the second frequency band belong to a same carrier.

According to the information transmission method provided in this embodiment of the present invention, the first radio resource and the second radio resource are different frequency bands in the uplink carrier, so that the user equipment can send the uplink information to the first network node and the second network node at the same time. Therefore, the user equipment can complete sending of all uplink information by setting only one sending device, which saves device costs.

Optionally, the first radio resource corresponds to a first period, and the first period is a period for transmitting the first uplink information between the user equipment and the first network node; and the second radio resource corresponds to a second period, and the second period is a period for transmitting the second uplink information between the user equipment and the second network node.

In addition, when the user equipment can send the uplink information to the first network node and the second network node by using at least two uplink carriers, the performing, by the user equipment, a sending operation according to the uplink transmission configuration information includes:

sending, by the user equipment, the first uplink information to the first network node by using a first uplink carrier in the first period; and sending, by the user equipment, the second uplink information to the second network node by using a second uplink carrier in the second period, where the first uplink carrier is different from the second uplink carrier.

According to the information transmission method provided in this embodiment of the present invention, the first radio resource and the second radio resource are different carriers used for sending in different periods, so that the user equipment can send the uplink information to the first network node and the second network node by using different carriers in different periods, which improves a capacity of uplink information and can adapt to transmission of massive uplink information.

Optionally, when the user equipment can send the uplink information to the first network node and the second network node by using one uplink carrier, the first period corresponds to at least one first uplink subframe of the uplink carrier and the second period corresponds to at least one second uplink subframe of the uplink carrier, where the first uplink subframe is different from the second uplink subframe, and the performing, by the user equipment, a sending operation according to the uplink transmission configuration information includes:

sending, by the user equipment, the first uplink information to the first network node by using the first uplink subframe; and sending, by the user equipment, the second uplink information to the second network node by using the second uplink subframe.

In addition, the uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

The uplink transmission configuration information is specifically used to indicate a location of the first downlink subframe of the first downlink carrier and a time interval between the first uplink subframe and the first downlink subframe; and the uplink transmission configuration information is specifically used to indicate a location of the second downlink subframe of the second downlink carrier and a time interval between the second uplink subframe and the second downlink subframe.

Alternatively, the uplink transmission configuration information is specifically used to indicate a location of the first uplink subframe of the uplink carrier; and a location of the second uplink subframe of the uplink carrier.

Thereafter, the first network node may send the foregoing determined uplink transmission configuration information to the user equipment.

Optionally, the uplink transmission configuration information is carried in at least one of the following messages sent by the first network node:

a broadcast message, a Radio Resource Control (RRC) message, a Medium Access Control control element (MAC CE), and a physical layer command. Therefore, new transmission signaling and messages are not needed, and practicality of the present invention can be improved. Therefore, the user equipment may determine, according to the uplink transmission configuration information, a resource (the first radio resource) used to transmit the first uplink information to the first network node and a resource (the second radio resource) used to transmit the second uplink information to the second network node.

Optionally, after the receiving, by the user equipment, uplink transmission configuration information sent by a first network node, the method further includes:

sending, by the user equipment, second acknowledgement information, so that the first network node and the second network node determine, according to the second acknowledgement information, that the user equipment can send the uplink information to the first network node and the second network node according to the uplink transmission configuration information.

According to the information transmission method provided in this embodiment of the present invention, after receiving the uplink transmission configuration information, the user equipment sends acknowledgement information to the first network node, which can improve reliability of transmission of the uplink information.

Optionally, the sending, by the user equipment, uplink information to the first network node and the second network node according to the uplink transmission configuration information includes:

receiving, by the user equipment, triggering information sent by the first network node or the second network node; and sending, by the user equipment, the uplink information to the first network node and the second network node according to the triggering information and the uplink transmission configuration information.

According to the information transmission method provided in this embodiment of the present invention, the first network node may receive, according to the uplink transmission configuration information, the first uplink information sent by the user equipment, which can reduce power consumption of the first network node, and implement energy conservation and environment protection.

According to the information transmission method provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node first for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

Figure 8:
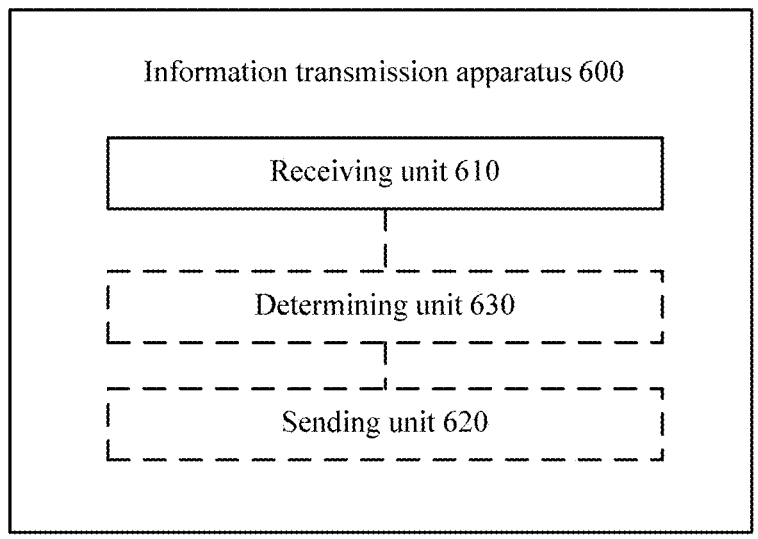
FIG. 8 is a schematic block diagram of an information transmission apparatus according to another embodiment of the present invention.
Figure 9:
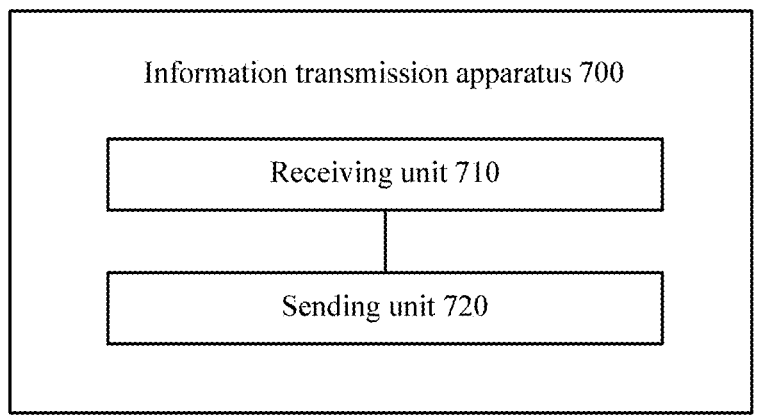
FIG. 9 is a schematic block diagram of an information transmission apparatus according to still another embodiment of the present invention.

The foregoing describes the information transmission methods according to the embodiments of the present invention in detail with reference to FIG. 1 to FIG. 6, and the following describes information transmission apparatuses according to the embodiments of the present invention in detail with reference to FIG. 7 to FIG. 9.

FIG. 7 is a schematic block diagram of an information transmission apparatus 500 according to an embodiment of the present invention. The apparatus 500 can send first downlink information to user equipment by using at least one first downlink carrier, a second network node can send second downlink information to the user equipment by using at least one second downlink carrier, and the user equipment can send uplink information to the apparatus and the second network node by using at least one uplink carrier. As shown in FIG. 7, the apparatus 500 includes:

a determining unit 510, configured to determine a first radio resource and a second radio resource that are different from each other, where the first radio resource is a resource used for transmitting first uplink information between the user equipment and the apparatus and the second radio resource is a resource used for transmitting second uplink information between the user equipment and the second network node;

a sending unit 520, configured to send uplink transmission configuration information to the user equipment, where the uplink transmission configuration information is used to indicate the first radio resource and the second radio resource, so that the user equipment sends the first uplink information to the apparatus 500 by using the first radio resource according to the uplink transmission configuration information and sends the second uplink information to the second network node by using the second radio resource according to the uplink transmission configuration information; and a receiving unit 530, configured to receive the first uplink information sent by the user equipment.

Optionally, the determining unit 510 is specifically configured to acquire quality of service (QoS) of a current service of the user equipment; and determine the first radio resource and the second radio resource according to the QoS of the current service of the user equipment.

Optionally, the determining unit 510 is specifically configured to determine the first radio resource according to a transmission requirement of the first uplink information, where the transmission requirement of the first uplink information includes at least one of the following parameters:

a data volume of the first uplink information, a transmission rate requirement of the first uplink information, a maximum tolerable delay of the first uplink information, a transmission channel status of the first uplink information, QoS of the first uplink information, and a load status of the apparatus 500.

Optionally, the receiving unit 530 is further configured to acquire auxiliary information from the second network node, where the auxiliary information is used to indicate a transmission requirement of the second uplink information, and/or the second radio resource, where the second radio resource is determined by the second network node according to the transmission requirement of the second uplink information, and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node; and the determining unit 510 is specifically configured to determine the second radio resource according to the auxiliary information acquired by the receiving unit 530.

Optionally, the sending unit 520 is further configured to send first request information to the second network node, so that the second network node sends auxiliary information to the apparatus 500 according to the first request information.

Optionally, the sending unit 520 is further configured to send sub-uplink transmission configuration information to the second network node, where the sub-uplink transmission configuration information is used to instruct the second network node to receive, by using the second radio resource, the second uplink information sent by the user equipment.

Optionally, the receiving unit 530 is further configured to receive first acknowledgement information sent by the second network node, where the first acknowledgement information is sent by the second network node after the second network node receives the sub-uplink transmission configuration information; and the determining unit 510 is further configured to determine, according to the first acknowledgement information, that the second network node can receive, according to the sub-uplink transmission configuration information, the second uplink information sent by the user equipment.

Optionally, the receiving unit 530 is further configured to receive second request information sent by the second network node; and the determining unit 510 is specifically configured to determine the first radio resource and the second radio resource according to the second request information.

Optionally, the determining unit 510 is specifically configured to determine the first radio resource and the second radio resource that are different from each other, where the first radio resource corresponds to a first frequency band, and the first frequency band is a frequency band used to transmit the first uplink information between the user equipment and the apparatus 500; the second radio resource corresponds to a second frequency band, and the second period is a frequency band used to transmit the second uplink information between the user equipment and the second network node; and the first frequency band and the second frequency band belong to a same carrier.

Optionally, the determining unit 510 is specifically configured to determine the first radio resource and the second radio resource that are different from each other, where the first radio resource corresponds to a first period, and the first period is a period for transmitting the first uplink information between the user equipment and the apparatus 500; and the second radio resource corresponds to a second period, and the second period is a period for transmitting second uplink information between the user equipment and the second network node.

Optionally, when the user equipment can send the uplink information to the apparatus 500 and the second network node by using at least two uplink carriers, the determining unit 510 is specifically configured to determine the first radio resource and the second radio resource that are different from each other, where the first period is specifically a period in which the user equipment sends the first uplink information to the apparatus 500 by using a first uplink carrier and the second period is specifically a period in which the user equipment sends the second uplink information to the second network node by using a second uplink carrier, where the first uplink carrier is different from the second uplink carrier.

Optionally, when the user equipment can send the uplink information to the apparatus 500 and the second network node by using one uplink carrier, the determining unit 510 is specifically configured to determine the first radio resource and the second radio resource that are different from each other, where the first period corresponds to at least one first uplink subframe of the uplink carrier and the second period corresponds to at least one second uplink subframe of the uplink carrier, where the first uplink subframe is different from the second uplink subframe.

Optionally, the uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

Optionally, the first downlink information is carried in at least two continuous or discontinuous subframes in the first downlink carrier, and/or the second downlink information is carried in at least two continuous or discontinuous subframes in the second downlink carrier.

Optionally, the uplink transmission configuration information is specifically used to indicate a location of the first downlink subframe of the first downlink carrier and a time interval between the first uplink subframe and the first downlink subframe; and the uplink transmission configuration information is specifically used to indicate a location of the second downlink subframe of the second downlink carrier and a time interval between the second uplink subframe and the second downlink subframe.

Optionally, the uplink transmission configuration information is specifically used to indicate a location of the first uplink subframe of the uplink carrier and a location of the second uplink subframe of the uplink carrier.

Optionally, the determining unit 510 is specifically configured to determine the first radio resource and the second radio resource that are different from each other, where a guard period is set between the first period and the second period, so that the user equipment performs conversion processing between transmission of the first uplink information and transmission of the second uplink information in the guard period.

Optionally, the first uplink information is feedback information of the first downlink information; and the second uplink information is feedback information of the second downlink information.

Optionally, the first uplink information includes at least one type of the following information: physical uplink control channel information, physical uplink shared channel information, and an uplink reference signal; and the second uplink information includes at least one type of the following information: physical uplink control channel information, physical uplink shared channel information, and an uplink reference signal.

Optionally, the physical uplink control channel information includes at least one type of the following information:

acknowledgement (ACK) information of a hybrid automatic repeat request (HARQ), negative acknowledgement (NACK) information of the HARQ, and scheduling request information.

Optionally, the physical uplink shared channel information includes at least one type of the following information:

retransmitted uplink data and newly-transmitted uplink data.

Optionally, the sending unit 520 is specifically configured to add the uplink transmission configuration information to at least one type of the following information and send the at least one type of the following information to the user equipment:

a broadcast message, a Radio Resource Control (RRC) message, a Medium Access Control control element (MAC CE), and a physical layer command.

Optionally, the receiving unit 530 is further configured to receive second acknowledgement information sent by the user equipment; and the determining unit 510 is further configured to control, in accordance with the second acknowledgement information, the receiving unit 530 to receive the first uplink information sent by the user equipment.

Optionally, the sending unit 520 is further configured to send triggering information to the user equipment, so that the user equipment sends the uplink information to the apparatus 500 and the second network node according to the triggering information and the uplink transmission configuration information.

Optionally, the determining unit 510 is further configured to control, according to the transmission configuration information, the receiving unit 530 to receive the first uplink information sent by the user equipment.

The information transmission apparatus 500 according to this embodiment of the present invention may correspond to the first network node (the base station of the primary cell or the primary base station) in the method in the embodiments of the present invention, and the units, that is, modules and other operations and/or functions, of the apparatus 500 are respectively for implementing corresponding processes in the method 100 in FIG. 2, and details are not described herein again for brevity.

According to the information transmission apparatus provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node first for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

FIG. 8 is a schematic block diagram of an information transmission apparatus 600 according to an embodiment of the present invention. The apparatus 600 can send second downlink information to user equipment by using at least one second downlink carrier, a first network node can send first downlink information to the user equipment by using at least one first downlink carrier, and the user equipment can send uplink information to the first network node and the apparatus 600 by using at least one uplink carrier. As shown in FIG. 8, the apparatus 600 includes:

a receiving unit 610, configured to receive second uplink information sent by the user equipment, where the second uplink information is sent by the user equipment according to uplink transmission configuration information, and the uplink configuration information is used to indicate a first radio resource and a second radio resource that are different from each other, where the first radio resource is a resource used for transmitting first uplink information between the user equipment and the first network node and the second radio resource is a resource used for transmitting the second uplink information between the user equipment and the apparatus 600.

Optionally, the apparatus 600 further includes:

a sending unit 620, configured to send auxiliary information to the first network node, where the auxiliary information is used to indicate a transmission requirement of the second uplink information, so that the first network node determines the second radio resource according to the auxiliary information, where the transmission requirement of the second uplink information includes at least one of the following parameters:

a data volume of the second uplink information, a transmission rate requirement of the second uplink information, a maximum tolerable delay of the second uplink information, a transmission channel status of the second uplink information, QoS of the second uplink information, and a load status of the apparatus 600.

Optionally, the apparatus 600 further includes:

a determining unit 630, configured to determine the second radio resource according to a transmission requirement of the second uplink information, where the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the apparatus 600; and a sending unit 620, configured to send the auxiliary information to the first network node, where the auxiliary information is used to indicate the second radio resource.

Optionally, the receiving unit 610 is further configured to receive first request information sent by the first network node; and the sending unit 620 is further configured to send the auxiliary information to the first network node according to the first request information.

Optionally, the receiving unit 610 is further configured to receive sub-uplink transmission configuration information sent by the first network node, where the sub-uplink transmission configuration information is used to instruct the apparatus 600 to receive, by using the second radio resource, the second uplink information sent by the user equipment; and receive, according to the sub-uplink transmission configuration information, the second uplink information sent by the user equipment.

Optionally, the apparatus 600 further includes:

a sending unit 620, configured to send first acknowledgement information to the first network node, so that the first network node determines, according to the first acknowledgement information, that the apparatus 600 can receive, by using the sub-uplink transmission configuration information, the second uplink information sent by the user equipment.

Optionally, the first radio resource corresponds to a first frequency band, and the first frequency band is a frequency band used to transmit the first uplink information between the user equipment and the first network node; the second radio resource corresponds to a second frequency band, and the second period is a frequency band used to transmit the second uplink information between the user equipment and the apparatus 600; and the first frequency band and the second frequency band belong to a same carrier.

Optionally, the first radio resource corresponds to a first period, and the first period is a period for transmitting the first uplink information between the user equipment and the first network node; and the second radio resource corresponds to a second period, and the second period is a period for transmitting the second uplink information between the user equipment and the apparatus 600.

Optionally, when the user equipment can send the uplink information to the first network node and the apparatus 600 by using at least two uplink carriers, the first period is specifically a period in which the user equipment sends the first uplink information to the first network node by using a first uplink carrier and the second period is specifically a period in which the user equipment sends the first uplink information to the apparatus 600 by using a second uplink carrier.

Optionally, when the user equipment can send the uplink information to the first network node and the apparatus 600 by using one uplink carrier, the first period corresponds to at least one first uplink subframe of the uplink carrier and the second period corresponds to at least one second uplink subframe of the uplink carrier, where the first uplink subframe is different from the second uplink subframe.

Optionally, the sub-uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

Optionally, the second downlink information is carried in at least two continuous or discontinuous subframes in the first downlink carrier.

Optionally, the sub-uplink transmission configuration information is specifically used to indicate a location of the second downlink subframe of the second downlink carrier and a time interval between the second uplink subframe and the second downlink subframe.

Optionally, the sub-uplink transmission configuration information is specifically used to indicate a location of the second uplink subframe of the uplink carrier.

Optionally, the first uplink information is feedback information of the first downlink information; and the second uplink information is feedback information of the second downlink information.

Optionally, the first uplink information includes at least one type of the following information: physical uplink control channel information, physical uplink shared channel information, and an uplink reference signal; and the second uplink information includes at least one type of the following information: physical uplink control channel information, physical uplink shared channel information, and an uplink reference signal that are for the second downlink information.

Optionally, the physical uplink control channel information includes at least one type of the following information:

acknowledgement (ACK) information of a hybrid automatic repeat request (HARQ), negative acknowledgement (NACK) information of the HARQ, and scheduling request information.

Optionally, the physical uplink shared channel information includes at least one type of the following information:

retransmitted uplink data and newly-transmitted uplink data.

Optionally, the apparatus 600 further includes:

a sending unit 620, configured to send triggering information to the user equipment, so that the user equipment sends the uplink information to the first network node and the apparatus 600 according to the triggering information and the uplink transmission configuration information.

Optionally, the first radio resource and the second radio resource are determined according to at least one type of the following information:

quality of service (QoS) of a current service of the user equipment, a data transmission requirement of the first uplink information, and the data transmission requirement of the second uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node; and the transmission requirement of the second uplink information includes at least one of the following parameters: the data volume of the second uplink information, the transmission rate requirement of the second uplink information, the maximum tolerable delay of the second uplink information, the transmission channel status of the second uplink information, the QoS of the second uplink information, and the load status of the apparatus 600.

The information transmission apparatus 600 according to this embodiment of the present invention may correspond to the second network node (the base station of the secondary cell or the secondary base station) in the method in the embodiments of the present invention, and the units, that is, modules and other operations and/or functions, of the apparatus 600 are respectively for implementing corresponding processes in the method 300 in FIG. 5, and details are not described herein again for brevity.

According to the information transmission apparatus provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

FIG. 9 is a schematic block diagram of an information transmission apparatus 700 according to an embodiment of the present invention. The apparatus 700 can send uplink information to a first network node and a second network node by using at least one uplink carrier, the first network node can send first downlink information to the apparatus 700 by using at least one first downlink carrier, and the second network node can send second downlink information to the apparatus 700 by using at least one second downlink carrier. As shown in FIG. 9, the apparatus 700 includes:

a receiving unit 710, configured to receive uplink transmission configuration information sent by the first network node, where the uplink configuration information is used to indicate a first radio resource and a second radio resource that are different from each other, where the first radio resource is a resource used for transmitting first uplink information between the apparatus 700 and the first network node and the second radio resource is a resource used for transmitting second uplink information between the apparatus 700 and the second network node; and a sending unit 720, configured to perform a sending operation according to the uplink transmission configuration information, to send the first uplink information to the first network node by using the first radio resource and send the second uplink information to the second network node by using the second radio resource.

Optionally, the first radio resource and the second radio resource are determined according to at least one type of the following information:

quality of service (QoS) of a current service of the apparatus 700, a data transmission requirement of the first uplink information, and a data transmission requirement of the second uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node; and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node.

Optionally, the first radio resource corresponds to a first frequency band, and the first frequency band is a frequency band used to transmit the first uplink information between the apparatus 700 and the first network node; the second radio resource corresponds to a second frequency band, and the second period is a frequency band used to transmit the second uplink information between the apparatus 700 and the second network node; and the first frequency band and the second frequency band belong to a same carrier.

Optionally, the first radio resource corresponds to a first period, and the first period is a period for transmitting the first uplink information between the apparatus 700 and the first network node; and the second radio resource corresponds to a second period, and the second period is a period for transmitting the second uplink information between the apparatus 700 and the second network node.

Optionally, when the apparatus 700 can send the uplink information to the first network node and the second network node by using at least two uplink carriers, the sending unit 720 is specifically configured to send the first uplink information to the first network node by using a first uplink carrier in the first period; and send the second uplink information to the second network node by using a second uplink carrier in the second period, where the first uplink carrier is different from the second uplink carrier.

Optionally, when the apparatus 700 can send the uplink information to the first network node and the second network node by using one uplink carrier, the first period corresponds to at least one first uplink subframe of the uplink carrier and the second period corresponds to at least one second uplink subframe of the uplink carrier, where the first uplink subframe is different from the second uplink subframe, and the sending unit 720 is specifically configured to send the first uplink information to the first network node by using the first uplink subframe; and send the second uplink information to the second network node by using the second uplink subframe.

Optionally, the uplink transmission configuration information is specifically used to indicate a correspondence between a first downlink subframe and the first uplink subframe, where the first downlink subframe is at least one subframe of the first downlink carrier used to carry the first downlink information; and the uplink transmission configuration information is specifically used to indicate a correspondence between a second downlink subframe and the second uplink subframe, where the second downlink subframe is at least one subframe of the second downlink carrier used to carry the second downlink information.

Optionally, the first downlink information is carried in at least two continuous or discontinuous subframes in the first downlink carrier, and/or the second downlink information is carried in at least two continuous or discontinuous subframes in the first downlink carrier.

Optionally, the uplink transmission configuration information is specifically used to indicate a location of the first downlink subframe of the first downlink carrier and a time interval between the first uplink subframe and the first downlink subframe; and the uplink transmission configuration information is specifically used to indicate a location of the second downlink subframe of the second downlink carrier and a time interval between the second uplink subframe and the second downlink subframe.

Optionally, the uplink transmission configuration information is specifically used to indicate a location of the first uplink subframe of the uplink carrier; and the uplink transmission configuration information is specifically used to indicate a location of the second uplink subframe of the uplink carrier.

Optionally, a guard period is set between a first period and a second period, so that the sending unit 720 is specifically configured to perform conversion processing between transmission of the first uplink information and transmission of the second uplink information in the guard period according to the uplink transmission configuration information.

Optionally, the first uplink information is feedback information of the first downlink information; and the second uplink information is feedback information of the second downlink information.

Optionally, the first uplink information includes at least one type of the following information: physical uplink control channel information, physical uplink shared channel information, and an uplink reference signal; and the second uplink information includes at least one type of the following information: physical uplink control channel information, physical uplink shared channel information, and an uplink reference signal.

Optionally, the physical uplink control channel information includes at least one type of the following information:

acknowledgement (ACK) information of a hybrid automatic repeat request (HARQ), negative acknowledgement (NACK) information of the HARQ, and scheduling request information.

Optionally, the physical uplink shared channel information includes at least one type of the following information:

retransmitted uplink data and newly-transmitted uplink data.

Optionally, the uplink transmission configuration information is carried in at least one of the following messages sent by the first network node:

a broadcast message, a Radio Resource Control (RRC) message, a Medium Access Control control element (MAC CE), and a physical layer command.

Optionally, the sending unit 720 is further configured to send first acknowledgement information, so that the first network node and the second network node determine, according to the first acknowledgement information, that the apparatus 700 can send the uplink information to the first network node and the second network node according to the uplink transmission configuration information.

Optionally, the receiving unit 710 is further configured to receive triggering information sent by the first network node or the second network node; and the sending unit 720 is specifically configured to send the uplink information to the first network node and the second network node according to the triggering information and the uplink transmission configuration information.

The information transmission apparatus 700 according to this embodiment of the present invention may correspond to the user equipment in the method in the embodiment of the present invention, and the units, that is, modules, and other operations and/or functions, of the apparatus 700 are respectively for implementing corresponding processes in the method 400 in FIG. 6, and details are not described herein again for brevity.

According to the information transmission apparatus provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

Figure 10:
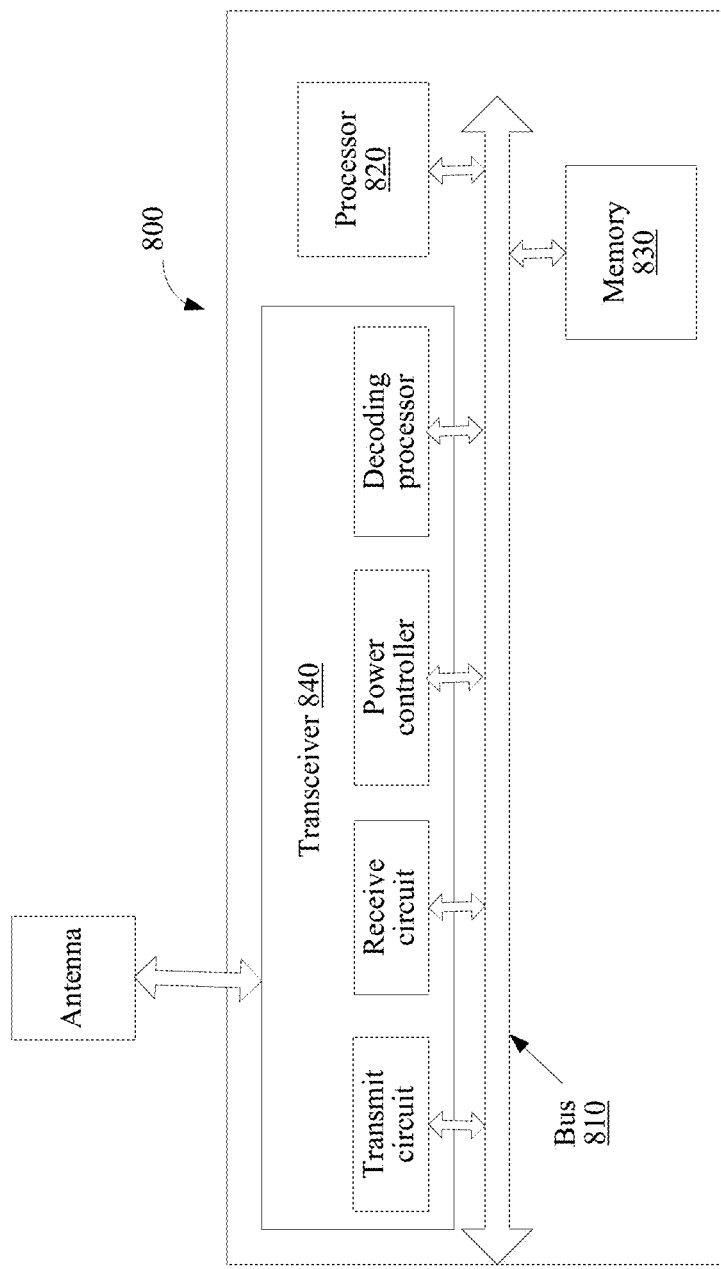
FIG. 10 is a schematic diagram of a structure of an information transmission device according to an embodiment of the present invention.
Figure 11:
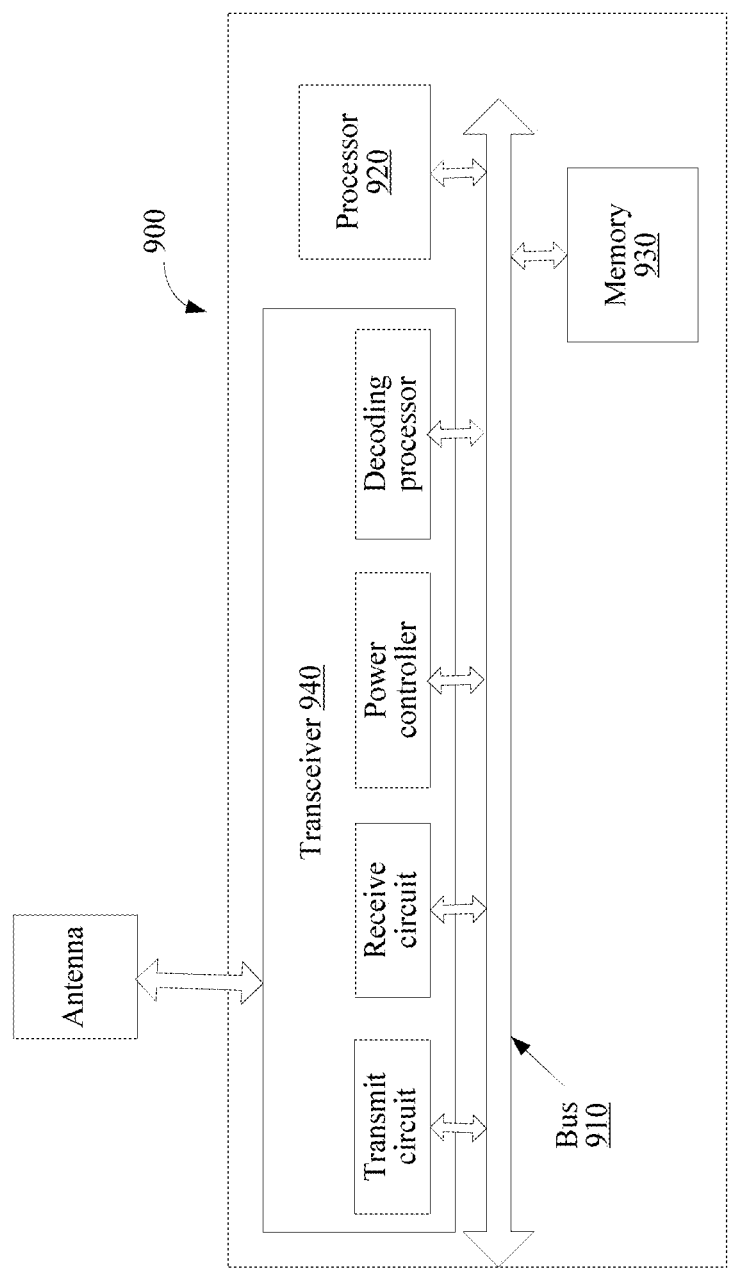
FIG. 11 is a schematic diagram of a structure of an information transmission device according to another embodiment of the present invention.
Figure 12:
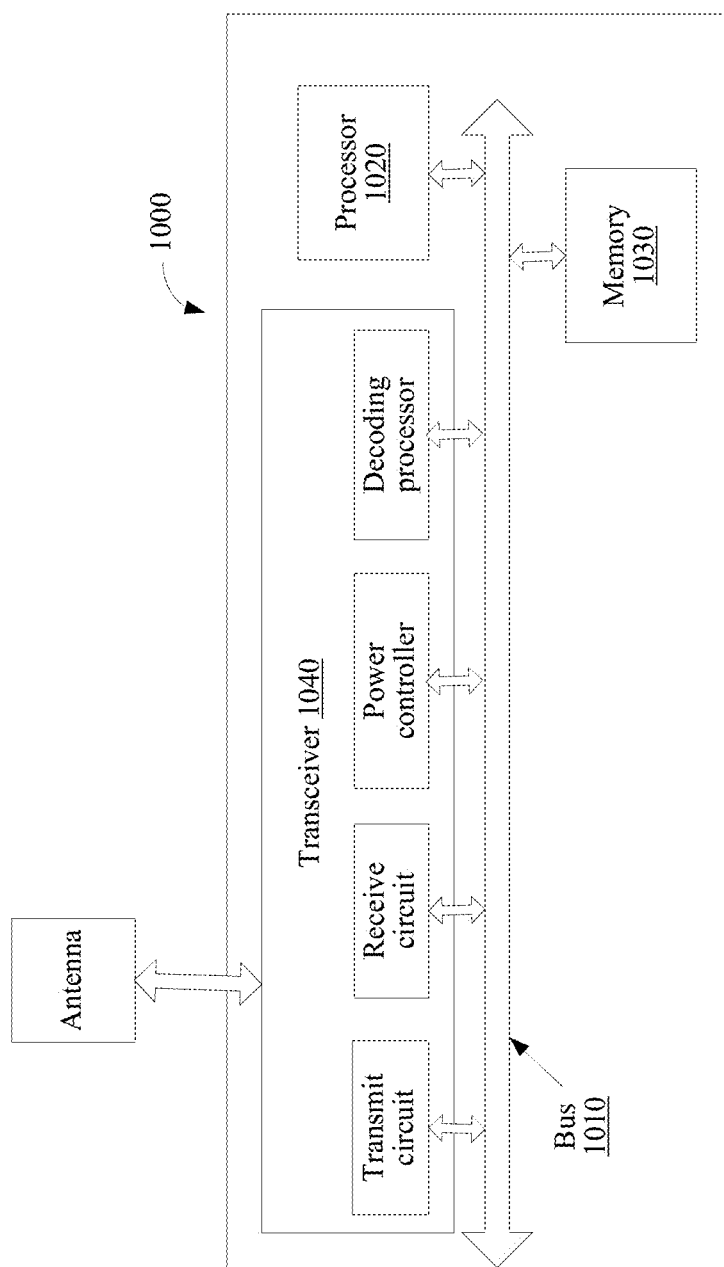
FIG. 12 is a schematic diagram of a structure of an information transmission device according to still another embodiment of the present invention.

The foregoing describes the information transmission methods according to the embodiments of the present invention in detail with reference to FIG. 1 to FIG. 6, and the following describes information transmission devices according to the embodiments of the present invention in detail with reference to FIG. 10 to FIG. 12.

FIG. 10 is a schematic block diagram of an information transmission device 800 according to an embodiment of the present invention. The device 800 can send first downlink information to user equipment by using at least one first downlink carrier, a second network node can send second downlink information to the user equipment by using at least one second downlink carrier, and the user equipment can send uplink information to the device and the second network node by using at least one uplink carrier. As shown in FIG. 10, the device 800 includes:

a bus 810;

a processor 820 connected to the bus 810;

a memory 830 connected to the bus 810; and a transceiver 840 connected to the bus 810, where the processor 820 invokes, by using the bus 810, a program stored in the memory 830, to determine a first radio resource and a second radio resource that are different from each other, where the first radio resource is a resource used for transmitting first uplink information between the user equipment and the device 800 and the second radio resource is a resource used for transmitting second uplink information between the user equipment and the second network node;

control the transceiver 840 to send uplink transmission configuration information to the user equipment, where the uplink transmission configuration information is used to indicate the first radio resource and the second radio resource, so that the user equipment sends the first uplink information to the device 800 by using the first radio resource according to the uplink transmission configuration information and sends the second uplink information to the second network node by using the second radio resource according to the uplink transmission configuration information; and control the transceiver 840 to receive the first uplink information sent by the user equipment.

Optionally, the processor 820 is specifically configured to acquire quality of service (QoS) of a current service of the user equipment; and determine the first radio resource and the second radio resource according to the QoS of the current service of the user equipment.

Optionally, the processor 820 is specifically configured to determine the first radio resource according to a transmission requirement of the first uplink information, where the transmission requirement of the first uplink information includes at least one of the following parameters:

a data volume of the first uplink information, a transmission rate requirement of the first uplink information, a maximum tolerable delay of the first uplink information, a transmission channel status of the first uplink information, QoS of the first uplink information, and a load status of the device 800.

Optionally, the processor 820 is specifically configured to control the transceiver 840 to acquire auxiliary information from the second network node, where the auxiliary information is used to indicate a transmission requirement of the second uplink information, and/or the second radio resource, where the second radio resource is determined by the second network node according to the transmission requirement of the second uplink information, and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node; and determine the second radio resource according to the auxiliary information.

Optionally, the processor 820 is specifically configured to control the transceiver 840 to send first request information to the second network node, so that the second network node sends auxiliary information to the device 800 according to the first request information.

Optionally, the processor 820 is specifically configured to control the transceiver 840 to send sub-uplink transmission configuration information to the second network node, where the sub-uplink transmission configuration information is used to instruct the second network node to receive, by using the second radio resource, the second uplink information sent by the user equipment.

Optionally, the processor 820 is specifically configured to control the transceiver 840 to receive first acknowledgement information sent by the second network node, where the first acknowledgement information is sent by the second network node after the second network node receives the sub-uplink transmission configuration information; and determine, according to the first acknowledgement information, that the second network node can receive, according to the sub-uplink transmission configuration information, the second uplink information sent by the user equipment.

Optionally, the processor 820 is specifically configured to control the transceiver 840 to receive second request information sent by the second network node; and determine the first radio resource and the second radio resource according to the second request information.

Optionally, the processor 820 is specifically configured to determine the first radio resource and the second radio resource that are different from each other, where the first radio resource corresponds to a first frequency band, and the first frequency band is a frequency band used to transmit the first uplink information between the user equipment and the device 800; the second radio resource corresponds to a second frequency band, and the second period is a frequency band used to transmit the second uplink information between the user equipment and the second network node; and the first frequency band and the second frequency band belong to a same carrier.

Optionally, the processor 820 is specifically configured to determine the first radio resource and the second radio resource that are different from each other, where the first radio resource corresponds to a first period, and the first period is a period for transmitting the first uplink information between the user equipment and the device 800; and the second radio resource corresponds to a second period, and the second period is a period for transmitting the second uplink information between the user equipment and the second network node.

Optionally, when the user equipment can send the uplink information to the device 800 and the second network node by using at least two uplink carriers, the processor 820 is specifically configured to determine the first radio resource and the second radio resource that are different from each other, where the first period is specifically a period in which the user equipment sends the first uplink information to the device 800 by using a first uplink carrier and the second period is specifically a period in which the user equipment sends the second uplink information to the second network node by using a second uplink carrier, where the first uplink carrier is different from the second uplink carrier.

Optionally, when the user equipment can send the uplink information to the device 800 and the second network node by using one uplink carrier, the processor 820 is specifically configured to determine the first radio resource and the second radio resource that are different from each other, where the first period corresponds to at least one first uplink subframe of the uplink carrier and the second period corresponds to at least one second uplink subframe of the uplink carrier, where the first uplink subframe is different from the second uplink subframe.

Optionally, the uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

Optionally, the first downlink information is carried in at least two continuous or discontinuous subframes in the first downlink carrier, and/or the second downlink information is carried in at least two continuous or discontinuous subframes in the second downlink carrier.

Optionally, the uplink transmission configuration information is specifically used to indicate a location of the first downlink subframe of the first downlink carrier and a time interval between the first uplink subframe and the first downlink subframe; and the uplink transmission configuration information is specifically used to indicate a location of the second downlink subframe of the second downlink carrier and a time interval between the second uplink subframe and the second downlink subframe.

Optionally, the uplink transmission configuration information is specifically used to indicate a location of the first uplink subframe of the uplink carrier and a location of the second uplink subframe of the uplink carrier.

Optionally, the processor 820 is specifically configured to determine the first radio resource and the second radio resource that are different from each other, where a guard period is set between the first period and the second period, so that the user equipment performs conversion processing between transmission of the first uplink information and transmission of the second uplink information in the guard period.

Optionally, the first uplink information is feedback information of the first downlink information; and the second uplink information is feedback information of the second downlink information.

Optionally, the first uplink information includes at least one type of the following information: physical uplink control channel information, physical uplink shared channel information, and an uplink reference signal; and the second uplink information includes at least one type of the following information: physical uplink control channel information, physical uplink shared channel information, and an uplink reference signal.

Optionally, the physical uplink control channel information includes at least one type of the following information:

acknowledgement (ACK) information of a hybrid automatic repeat request (HARQ), negative acknowledgement (NACK) information of the HARQ, and scheduling request information.

Optionally, the physical uplink shared channel information includes at least one type of the following information:

retransmitted uplink data and newly-transmitted uplink data.

Optionally, the processor 820 is specifically configured to control the transceiver 840 to add the uplink transmission configuration information to at least one type of the following information and send the at least one type of the following information to the user equipment:

a broadcast message, a Radio Resource Control (RRC) message, a Medium Access Control control element (MAC CE), and a physical layer command.

Optionally, the processor 820 is specifically configured to control the transceiver 840 to receive second acknowledgement information sent by the user equipment; and control, in accordance with the second acknowledgement information, the transceiver 840 to receive the first uplink information sent by the user equipment.

Optionally, the processor 820 is specifically configured to control the transceiver 840 to send triggering information to the user equipment, so that the user equipment sends the uplink information to the device 800 and the second network node according to the triggering information and the uplink transmission configuration information.

Optionally, the processor 820 is specifically configured to control, according to the transmission configuration information, the transceiver 840 to receive the first uplink information sent by the user equipment.

In specific application, the device 800 may be embedded into a wireless communications device such as a base station, or the device 800 is a wireless communications device such as a base station. The device 800 may also include a carrier accommodating a transmit circuit and a receive circuit, to perform data transmission and receiving between the device 800 and a remote location. In this embodiment, the transceiver 840 includes a transmit circuit, a receive circuit, a power controller, a decoding processor, and an antenna. The transmit circuit and the receive circuit may be coupled into the antenna. In addition, in different products, the decoder may be specifically integrated with the processor 820.

The processor 820 may implement or execute methods, steps, and logical block diagrams disclosed in the embodiments of the present invention. The general purpose processor 820 may be a microprocessor or the processor may be any conventional processor, decoder, or the like. Steps of the methods disclosed with reference to the embodiments of the present invention may be directly executed and completed by means of a hardware processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 830, and the processor 820 reads information in the memory 830 and completes the steps in the foregoing methods in combination with hardware of the processor 820.

It should be understood that in this embodiment of the present invention, the processor 820 may be a central processing unit (Central Processing Unit, "CPU" for short), or the processor 820 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 830 may include a read-only memory and a random access memory, and provides an instruction and data to the processor 820. A part of the memory 830 may further include a non-volatile random access memory. For example, the memory 830 may further store device type information.

The bus 810, besides including a data bus, may further include a power bus, a control bus, a status signal bus, and the like. However, for clear description, various buses are marked as the bus 810 in the figure.

In an implementation process, each step of the method may be completed by using an integrated logic circuit of hardware in the encoding processor 820 or an instruction in a software form. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 830, and the processor 820 reads information in the memory 830 and completes the steps in the foregoing methods in combination with hardware of the processor 820. To avoid repetition, details are not described herein again.

The information transmission device 800 according to this embodiment of the present invention may correspond to the first network node (the base station of the primary cell or the primary base station) in the method in the embodiments of the present invention, and the units, that is, modules, and other operations and/or functions, of the device 800 are respectively for implementing corresponding processes in the method 100 in FIG. 2, and details are not described herein again for brevity.

According to the information transmission device provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

FIG. 11 is a schematic block diagram of an information transmission device 900 according to an embodiment of the present invention. The device 900 can send second downlink information to user equipment by using at least one second downlink carrier, a first network node can send first downlink information to the user equipment by using at least one first downlink carrier, and the user equipment can send uplink information to the first network node and the device 900 by using at least one uplink carrier. As shown in FIG. 11, the device 900 includes:

a bus 910;

a processor 920 connected to the bus 910;

a memory 930 connected to the bus 910; and a transceiver 940 connected to the bus 910, where the processor 920 invokes, by using the bus 910, a program stored in the memory 930, to control the transceiver 940 to receive second uplink information sent by the user equipment, where the second uplink information is sent by the user equipment according to uplink transmission configuration information, and the uplink configuration information is used to indicate a first radio resource and a second radio resource that are different from each other, where the first radio resource is a resource used for transmitting first uplink information between the user equipment and the first network node and the second radio resource is a resource used for transmitting the second uplink information between the user equipment and the device 900.

Optionally, the processor 920 is specifically configured to control the transceiver 940 to send auxiliary information to the first network node, where the auxiliary information is used to indicate a transmission requirement of the second uplink information, so that the first network node determines the second radio resource according to the auxiliary information, where the transmission requirement of the second uplink information includes at least one of the following parameters:

a data volume of the second uplink information, a transmission rate requirement of the second uplink information, a maximum tolerable delay of the second uplink information, a transmission channel status of the second uplink information, QoS of the second uplink information, and a load status of the device 900.

Optionally, the processor 920 is specifically configured to determine the second radio resource according to a transmission requirement of the second uplink information, where the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the device 900; and control the transceiver 940 to send auxiliary information to the first network node, where the auxiliary information is used to indicate the second radio resource.

The processor 920 is specifically configured to control the transceiver 940 to receive first request information sent by the first network node; and control, according to the first request information, the transceiver 940 to send the auxiliary information to the first network node.

Optionally, the processor 920 is specifically configured to control the transceiver 940 to receive sub-uplink transmission configuration information sent by the first network node, where the sub-uplink transmission configuration information is used to instruct the device 900 to receive, by using the second radio resource, the second uplink information sent by the user equipment; and control, according to the sub-uplink transmission configuration information, the transceiver 940 to receive the second uplink information sent by the user equipment.

The processor 920 is specifically configured to control the transceiver 940 to send first acknowledgement information to the first network node, so that the first network node determines, according to the first acknowledgement information, that the device 900 can receive, by using the sub-uplink transmission configuration information, the second uplink information sent by the user equipment.

Optionally, the first radio resource corresponds to a first frequency band, and the first frequency band is a frequency band used to transmit the first uplink information between the user equipment and the first network node; the second radio resource corresponds to a second frequency band, and the second period is a frequency band used to transmit the second uplink information between the user equipment and the device 900; and the first frequency band and the second frequency band belong to a same carrier.

Optionally, the first radio resource corresponds to a first period, and the first period is a period for transmitting the first uplink information between the user equipment and the first network node; and the second radio resource corresponds to a second period, and the second period is a period for transmitting the second uplink information between the user equipment and the device 900.

Optionally, when the user equipment can send the uplink information to the first network node and the device 900 by using at least two uplink carriers, the first period is specifically a period in which the user equipment sends the first uplink information to the first network node by using a first uplink carrier and the second period is specifically a period in which the user equipment sends the first uplink information to the device 900 by using a second uplink carrier.

Optionally, when the user equipment can send the uplink information to the first network node and the device 900 by using one uplink carrier, the first period corresponds to at least one first uplink subframe of the uplink carrier and the second period corresponds to at least one second uplink subframe of the uplink carrier, where the first uplink subframe is different from the second uplink subframe.

Optionally, the sub-uplink transmission configuration information is specifically used to indicate a correspondence between a first downlink subframe and the first uplink subframe and a correspondence between a second downlink subframe and the second uplink subframe, where the first downlink subframe is at least one subframe of the first downlink carrier used to carry the first downlink information and the second downlink subframe is at least one subframe of the second downlink carrier used to carry the second downlink information.

Optionally, the second downlink information is carried in at least two continuous or discontinuous subframes in the first downlink carrier.

Optionally, the sub-uplink transmission configuration information is specifically used to indicate a location of the second downlink subframe of the second downlink carrier and a time interval between the second uplink subframe and the second downlink subframe.

Optionally, the sub-uplink transmission configuration information is specifically used to indicate a location of the second uplink subframe of the uplink carrier.

Optionally, the first uplink information is feedback information of the first downlink information; and
the second uplink information is feedback information of the second downlink information.

Optionally, the first uplink information includes at least one type of the following information: physical uplink control channel information, physical uplink shared channel information, and an uplink reference signal; and
the second uplink information includes at least one type of the following information: physical uplink control channel information, physical uplink shared channel information, and an uplink reference signal that are for the second downlink information.

Optionally, the physical uplink control channel information includes at least one type of the following information:
acknowledgement (ACK) information of a hybrid automatic repeat request (HARQ), negative acknowledgement (NACK) information of the HARQ, and scheduling request information.

Optionally, the physical uplink shared channel information includes at least one type of the following information:
retransmitted uplink data and newly-transmitted uplink data.

Optionally, the processor 920 is specifically configured to control the transceiver 940 to send triggering information to the user equipment, so that the user equipment sends the uplink information to the first network node and the device 900 according to the triggering information and the uplink transmission configuration information.

Optionally, the first radio resource and the second radio resource are determined according to at least one type of the following information:
quality of service (QoS) of a current service of the user equipment, a data transmission requirement of the first uplink information, and the data transmission requirement of the second uplink information, where
the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node; and
the transmission requirement of the second uplink information includes at least one of the following parameters: the data volume of the second uplink information, the transmission rate requirement of the second uplink information, the maximum tolerable delay of the second uplink information, the transmission channel status of the second uplink information, the QoS of the second uplink information, and the load status of the device 900.

In specific application, the device 900 may be embedded into a wireless communications device such as a base station, or the device 900 is a wireless communications device such as a base station. The device 800 may also include a carrier accommodating a transmit circuit and a receive circuit, to perform data transmission and receiving between the device 800 and a remote location. In this embodiment, the transceiver 940 includes a transmit circuit, a receive circuit, a power controller, a decoding processor, and an antenna. The transmit circuit and the receive circuit may be coupled into the antenna. In addition, in different products, the decoder may be specifically integrated with the processor 920.

The processor 920 may implement or execute methods, steps, and logical block diagrams disclosed in the embodiments of the present invention. The general purpose processor 920 may be a microprocessor or the processor may be any conventional processor, decoder, or the like. Steps of the methods disclosed with reference to the embodiments of the present invention may be directly executed and completed by means of a hardware processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 930, and the processor 920 reads information in the memory 930 and completes the steps in the foregoing methods in combination with hardware of the processor 920.

It should be understood that in this embodiment of the present invention, the processor 920 may be a central processing unit (Central Processing Unit, "CPU" for short), or the processor 920 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 930 may include a read-only memory and a random access memory, and provides an instruction and data to the processor 920. A part of the memory 930 may further include a non-volatile random access memory. For example, the memory 930 may further store device type information.

The bus system 910, besides including a data bus, may further include a power bus, a control bus, a status signal bus, and the like. However, for clear description, various buses are marked as the bus 910 in the figure.

In an implementation process, each step of the method may be completed by using an integrated logic circuit of hardware in the encoding processor 920 or an instruction in a software form. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable read-only memory, or a register. The storage medium is located in the memory 930, and the processor 920 reads information in the memory 930 and completes the steps in the foregoing methods in combination with hardware of the processor 920. To avoid repetition, details are not described herein again.

The information transmission device 900 according to this embodiment of the present invention may correspond to the second network node (the base station of the secondary cell or the secondary base station) in the method in the embodiments of the present invention, and the units, that is, modules, and other operations and/or functions, of the device 900 are respectively for implementing corresponding processes in the method 300 in FIG. 5, and details are not described herein again for brevity.

According to the information transmission device provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

FIG. 12 is a schematic block diagram of an information transmission device 1000 according to an embodiment of the present invention. The device 1000 can send uplink information to a first network node and a second network node by using at least one uplink carrier, the first network node can send first downlink information to the device 1000 by using at least one first downlink carrier, and the second network node can send second downlink information to the device 1000 by using at least one second downlink carrier. As shown in FIG. 12, the device 1000 includes:

a bus 1010;
a processor 1020 connected to the bus 1010;
a memory 1030 connected to the bus 1010;
a transceiver 1040 connected to the bus 1010, where the processor 1020 invokes, by using the bus 1010, a program stored in the memory 1030, to control the transceiver 1040 to receive uplink transmission configuration information sent by the first network node, where the uplink configuration information is used to indicate a first radio resource and a second radio resource that are different from each other, where the first radio resource is a resource used for transmitting first uplink information between the user equipment and the first network node and the second radio resource is a resource used for transmitting second uplink information between the user equipment and the second network node; and control, according to the uplink transmission configuration information, the transceiver 1040 to send the first uplink information to the first network node by using the first radio resource and send the second uplink information to the second network node by using the second radio resource.

Optionally, the first radio resource and the second radio resource are determined according to at least one type of the following information:

quality of service (QoS) of a current service of the user equipment, a data transmission requirement of the first uplink information, and a data transmission requirement of the second uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node; and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node.

Optionally, the first radio resource corresponds to a first frequency band, and the first frequency band is a frequency band used to transmit the first uplink information between the user equipment and the first network node; the second radio resource corresponds to a second frequency band, and the second period is a frequency band used to transmit the second uplink information between the user equipment and the second network node; and the first frequency band and the second frequency band belong to a same carrier.

Optionally, the first radio resource corresponds to a first period, and the first period is a period for transmitting the first uplink information between the user equipment and the first network node; and the second radio resource corresponds to a second period, and the second period is a period for transmitting the second uplink information between the user equipment and the second network node.

Optionally, when the user equipment can send the uplink information to the first network node and the second network node by using at least two uplink carriers, the processor 1020 is specifically configured to control the transceiver 1040 to send the first uplink information to the first network node by using a first uplink carrier in the first period; and control the transceiver 1040 to send the second uplink information to the second network node by using a second uplink carrier in the second period, where the first uplink carrier is different from the second uplink carrier.

Optionally, when the user equipment can send the uplink information to the first network node and the second network node by using one uplink carrier, the first period corresponds to at least one first uplink subframe of the uplink carrier and the second period corresponds to at least one second uplink subframe of the uplink carrier, where the first uplink subframe is different from the second uplink subframe, and the processor 1020 is specifically configured to control the transceiver 1040 to send the first uplink information to the first network node by using the first uplink subframe; and control the transceiver 1040 to send the second uplink information to the second network node by using the second uplink subframe.

Optionally, the uplink transmission configuration information is specifically used to indicate a correspondence between a first downlink subframe and the first uplink subframe, where the first downlink subframe is at least one subframe of the first downlink carrier used to carry the first downlink information; and the uplink transmission configuration information is specifically used to indicate a correspondence between a second downlink subframe and the second uplink subframe, where the second downlink subframe is at least one subframe of the second downlink carrier used to carry the second downlink information.

Optionally, the first downlink information is carried in at least two continuous or discontinuous subframes in the first downlink carrier, and/or the second downlink information is carried in at least two continuous or discontinuous subframes in the first downlink carrier.

Optionally, the uplink transmission configuration information is specifically used to indicate a location of the first downlink subframe of the first downlink carrier and a time interval between the first uplink subframe and the first downlink subframe; and the uplink transmission configuration information is specifically used to indicate a location of the second downlink subframe of the second downlink carrier and a time interval between the second uplink subframe and the second downlink subframe.

Optionally, the uplink transmission configuration information is specifically used to indicate a location of the first uplink subframe of the uplink carrier; and the uplink transmission configuration information is specifically used to indicate a location of the second uplink subframe of the uplink carrier.

Optionally, a guard period is set between the first period and the second period, and the processor 1020 is specifically configured to control the transceiver 1040 to perform conversion processing between transmission of the first uplink information and transmission of the second uplink information in the guard period according to the uplink transmission configuration information.

Optionally, the first uplink information is feedback information of the first downlink information; and the second uplink information is feedback information of the second downlink information.

Optionally, the first uplink information includes at least one type of the following information: physical uplink control channel information, physical uplink shared channel information, and an uplink reference signal; and the second uplink information includes at least one type of the following information: physical uplink control channel information, physical uplink shared channel information, and an uplink reference signal.

Optionally, the physical uplink control channel information includes at least one type of the following information:

acknowledgement (ACK) information of a hybrid automatic repeat request (HARQ), negative acknowledgement (NACK) information of the HARQ, and scheduling request information.

Optionally, the physical uplink shared channel information includes at least one type of the following information:

retransmitted uplink data and newly-transmitted uplink data.

Optionally, the uplink transmission configuration information is carried in at least one of the following messages sent by the first network node:

a broadcast message, a Radio Resource Control (RRC) message, a Medium Access Control control element (MAC CE), and a physical layer command.

Optionally, the processor 1020 is specifically configured to control the transceiver 1040 to send first acknowledgement information, so that the first network node and the second network node determine, according to the first acknowledgement information, that the user equipment can send the uplink information to the first network node and the second network node according to the uplink transmission configuration information.

Optionally, the processor 1020 is specifically configured to control the transceiver 1040 to receive triggering information sent by the first network node or the second network node; and control, according to the triggering information and the uplink transmission configuration information, the transceiver 1040 to send the uplink information to the first network node and the second network node according to the triggering information and the uplink transmission configuration information.

In specific application, the device 1000 may be embedded into a wireless communications device such as user equipment, or the device 1000 is a wireless communications device such as user equipment. The device 800 may also include a carrier accommodating a transmit circuit and a receive circuit, to perform data transmission and receiving between the device 1000 and a remote location. In this embodiment, the transceiver 1040 includes a transmit circuit, a receive circuit, a power controller, a decoding processor, and an antenna. The transmit circuit and the receive circuit may be coupled into the antenna. In addition, in different products, the decoder may be specifically integrated with the processor 1020.

The processor 1020 may implement or execute methods, steps, and logical block diagrams disclosed in the embodiments of the present invention. The general purpose processor 1020 may be a microprocessor or the processor may be any conventional processor, decoder, or the like. Steps of the methods disclosed with reference to the embodiments of the present invention may be directly executed and completed by means of a hardware processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1030, and the processor 1020 reads information in the memory 1030 and completes the steps in the foregoing methods in combination with hardware of the processor 1020.

It should be understood that in this embodiment of the present invention, the processor 1020 may be a central processing unit (Central Processing Unit, "CPU" for short), or the processor 1020 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 1030 may include a read-only memory and a random access memory, and provides an instruction and data to the processor 1020. A part of the memory 1030 may further include a non-volatile random access memory. For example, the memory 1030 may further store device type information.

The bus system 1010, besides including a data bus, may further include a power bus, a control bus, a status signal bus, and the like. However, for clear description, various buses are marked as the bus 1010 in the figure.

In an implementation process, each step of the method may be completed by using an integrated logic circuit of hardware in the encoding processor 1020 or an instruction in a software form. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1030, and the processor 1020 reads information in the memory 1030 and completes the steps in the foregoing methods in combination with hardware of the processor 1020. To avoid repetition, details are not described herein again.

The information transmission device 1000 according to this embodiment of the present invention may correspond to the user equipment in the method in the embodiment of the present invention, and the units, that is, modules, and other operations and/or functions, of the device 1000 are respectively for implementing corresponding processes in the method 400 in FIG. 6, and details are not described herein again for brevity.

According to the information transmission device provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

Figure 13:
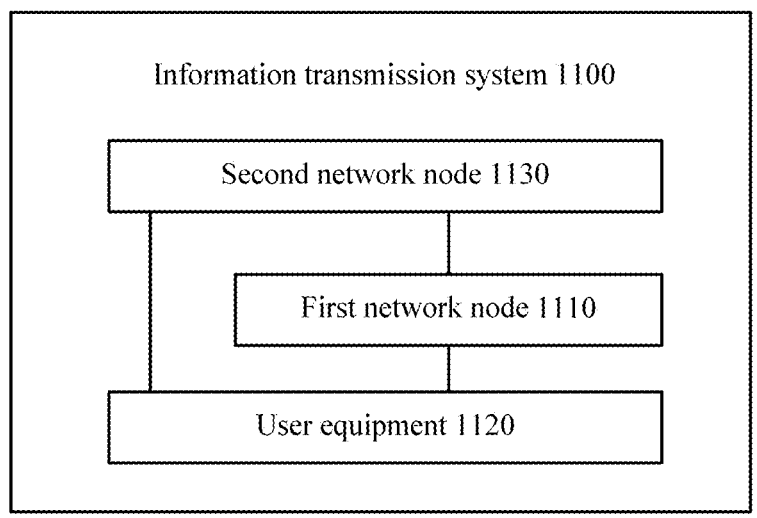
FIG. 13 is a schematic block diagram of an information transmission system according to an embodiment of the present invention.

The foregoing describes the information transmission methods according to the embodiments of the present invention in detail with reference to FIG. 1 to FIG. 6, and the following describes an information transmission system according to the embodiments of the present invention in detail with reference to FIG. 13.

FIG. 13 is a schematic block diagram of an information transmission system 1100 according to an embodiment of the present invention. As shown in FIG. 13, the system 1100 includes at least two network nodes and user equipment 1120, where a first network node 1110 can send first downlink information to the user equipment 1120 by using at least one first downlink carrier, a second network node 1130 can send second downlink information to the user equipment 1120 by using at least one second downlink carrier, and the user equipment 1120 can send uplink information to the first network node 1110 and the second network node 1130 by using at least one uplink carrier, where the first network node 1110 is configured to send uplink transmission configuration information to the user equipment 1120, where the uplink transmission configuration information is used to indicate a first radio resource and a second radio resource that are different from each other, where the first radio resource is a resource used for transmitting first uplink information between the user equipment 1120 and the first network node 1110 and the second radio resource is a resource used for transmitting second uplink information between the user equipment 1120 and the second network node 1130; and the user equipment 1120 is configured to receive the uplink transmission configuration information, send the first uplink information to the first network node 1110 according to the uplink transmission configuration information, and send the second uplink information to the second network node 1130 according to the uplink transmission configuration information.

Optionally, the uplink transmission configuration information is determined according to at least one type of the following information:

quality of service (QoS) of a current service of the user equipment 1120, a data transmission requirement of the first uplink information, and a data transmission requirement of the second uplink information, where the transmission requirement of the first uplink information includes at least one of the following parameters: a data volume of the first uplink information, a transmission rate requirement of the first uplink information, a maximum tolerable delay of the first uplink information, a transmission channel status of the first uplink information, QoS of the first uplink information, and a load status of the first network node 1110; and the transmission requirement of the second uplink information includes at least one of the following parameters: a data volume of the second uplink information, a transmission rate requirement of the second uplink information, a maximum tolerable delay of the second uplink information, a transmission channel status of the second uplink information, QoS of the second uplink information, and a load status of the second network node 1130.

In the information transmission system according to this embodiment of the present invention, the units, that is, modules, and other operations and/or functions, of the first network node 1110 are respectively for implementing corresponding processes of the method 100 in FIG. 2, the units, that is, modules, and other operations and/or functions, of the second network node 1130 are separately for implementing corresponding processes of the method 300 in FIG. 5, and the units, that is, modules, and other operations and/or functions, of the user equipment 1120 are separately for implementing corresponding processes of the method 400 in FIG. 6, and details are not described herein again for brevity.

According to the information transmission device provided in this embodiment of the present invention, a first network node determines uplink transmission configuration information and sends the uplink transmission configuration information to user equipment, where the uplink transmission configuration information indicates a first period and a second period that are different from each other, or the uplink transmission configuration information indicates a first frequency band and a second frequency band that are different from each other, so that the user equipment can transmit first uplink information to the first network node in the first period and transmit second uplink information to a second network node in the second period, or transmit first uplink information to the first network node at the first frequency band and transmit second uplink information to a second network node at the second frequency band. Therefore, the user equipment does not need to transmit the second uplink information to the first network node for the first network node to transmit the second uplink information to the second network node by using an ideal backhaul, which can reduce network deployment difficulties. Furthermore, the present invention can be applied to a non-fiber backhaul network having a latency, to avoid a sending delay of physical uplink control channel information and a sending delay of physical uplink shared channel information that are caused by the latency of the backhaul network, thereby improving wireless communication efficiency.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
   determining, by a first network node of at least two network nodes, a quality of service (QoS) of a current service of a user equipment according to a priority of the current service among a plurality of services and bit rate information of the current service;
   determining, by the first network node, according to the QoS of the current service of the user equipment, a first radio resource, wherein the first radio resource is a resource used for transmitting first uplink information between the user equipment and the first network node, wherein the first network node sends first downlink information to the user equipment by using at least one first downlink carrier, wherein a second network node of the at least two network nodes sends second downlink information to the user equipment by using at least one second downlink carrier, and wherein the user equipment sends uplink information to the first network node and the second network node by using a same first uplink carrier;
   acquiring, by the first network node, auxiliary information from the second network node, wherein the auxiliary information indicates a transmission requirement of at least one of second uplink information and a second radio resource, wherein the second radio resource is indicated in the auxiliary information by the second network node according to the transmission requirement of the second uplink information, and wherein the transmission requirement of the second uplink information comprises at least one of a data volume of the second uplink information, a transmission rate requirement of the second uplink information, a maximum tolerable delay of the second uplink information, a transmission channel status of the second uplink information, QoS of the second uplink information, and a load status of the second network node;
   determining, by the first network node, according to the QoS of the current service of the user equipment, and according to the auxiliary information from the second network node, the second radio resource, wherein the second radio resource is a resource used for transmitting the second uplink information between the user equipment and the second network node, wherein the second radio resource is different from the first radio resource; and
   sending, by the first network node, uplink transmission configuration information to the user equipment, wherein the uplink transmission configuration information indicates the first radio resource and the second radio resource, and wherein the uplink transmission configuration information is used by the user equipment to send the first uplink information to the first network node by using the first radio resource on the same first uplink carrier and to send the second uplink information to the second network node by using the second radio resource on the same first uplink carrier.

2. The method according to claim 1, wherein the determining, by the first network node, a first radio resource comprises:
   determining, by the first network node, the first radio resource according to a transmission requirement of the first uplink information, wherein the transmission requirement of the first uplink information comprises at least one of a data volume of the first uplink information, a transmission rate requirement of the first uplink information, a maximum tolerable delay of the first uplink information, a transmission channel status of the first uplink information, QoS of the first uplink information, and a load status of the first network node.

3. The method according to claim 1, wherein the acquiring, by the first network node, auxiliary information from the second network node, comprises:
   sending, by the first network node, first request information to the second network node, wherein the first request information is used by the second network node to send the auxiliary information to the first network node; and
   acquiring, by the first network node, the auxiliary information sent from the second network node.

4. The method according to claim 3, wherein the method further comprises:
   receiving, by the first network node and before the sending the first request information to the second network node, second request information sent from the second network node.

5. The method according to claim 1, wherein the method further comprises:
   sending, by the first network node, sub-uplink transmission configuration information to the second network node, wherein the sub-uplink transmission configuration information instructs the second network node to receive, by using the second radio resource, the second uplink information sent by the user equipment.

6. The method according to claim 5, wherein the method further comprises performing, before the sending the uplink transmission configuration information to the user equipment:
   receiving, by the first network node, first acknowledgement information sent by the second network node, wherein the first acknowledgement information is sent by the second network node after the second network node receives the sub-uplink transmission configuration information; and
   determining, by the first network node according to the first acknowledgement information, that the second network node is able to receive, according to the sub-uplink transmission configuration information, the second uplink information sent by the user equipment.

7. The method according to claim 1, wherein the first uplink information is feedback information of the first downlink information; and
   wherein the second uplink information is feedback information of the second downlink information.

8. The method according to claim 1, wherein the sending, by the first network node, uplink transmission configuration information to the user equipment comprises:
   adding, by the first network node, the uplink transmission configuration information to, and sending to the user equipment, at least one type of a broadcast message, a Radio Resource Control (RRC) message, a Medium Access Control control element (MAC CE), and a physical layer command.

9. An information transmission apparatus, comprising:
   a processor, configured to:
      determine a quality of service (QoS) of a current service of a user equipment according to a priority of the current service among a plurality of services and bit rate information of the current service;
      determine a second radio resource according to auxiliary information acquired from a second network node, wherein the auxiliary information indicates a transmission requirement of at least one of second uplink information and the second radio resource, wherein the second radio resource is indicated in the auxiliary information by the second network node according to the transmission requirement of the second uplink information and the transmission requirement of the second uplink information comprises at least one of a data volume of the second uplink information, a transmission rate requirement of the second uplink information, a maximum tolerable delay of the second uplink information, a transmission channel status of the second uplink information, QoS of the second uplink information, and a load status of the second network node; and determine, according to the QoS of the current service of the user equipment, and according to the auxiliary information from the second network node, a first radio resource and the second radio resource that are different from each other, wherein the first radio resource is a resource used for transmitting first uplink information between the user equipment and the apparatus and the second radio resource is a resource used for transmitting the second uplink information between the user equipment and the second network node, wherein the processor is further configured to cause the apparatus to send first downlink information to the user equipment by using at least one first downlink carrier, wherein the second network node sends second downlink information to the user equipment by using at least one second downlink carrier, and wherein the user equipment sends uplink information to the apparatus and the second network node by using a same uplink carrier; and a transceiver connected to the processor, the transceiver configured to send uplink transmission configuration information to the user equipment, wherein the uplink transmission configuration information indicates the first radio resource and the second radio resource, and wherein the uplink transmission configuration information is used by the user equipment to send the first uplink information to the apparatus by using the first radio resource on the same first uplink carrier and to send the second uplink information to the second network node by using the second radio resource on the same first uplink carrier.

10. The apparatus according to claim 9, wherein the processor is further configured to determine the first radio resource according to a transmission requirement of the first uplink information, wherein the transmission requirement of the first uplink information comprises at least one of a data volume of the first uplink information, a transmission rate requirement of the first uplink information, a maximum tolerable delay of the first uplink information, a transmission channel status of the first uplink information, QoS of the first uplink information, and a load status of the apparatus.

11. The apparatus according to claim 9, wherein the transceiver is further configured to send first request information to the second network node, and wherein the first request information is used by the second network node to send the auxiliary information to the apparatus.

12. The apparatus according to claim 11, wherein the transceiver is further configured to receive second request information sent from the second network node.

13. The apparatus according to claim 9, wherein the transceiver is further configured to send sub-uplink transmission configuration information to the second network node, wherein the sub-uplink transmission configuration information instructs the second network node to receive, by using the second radio resource, the second uplink information sent by the user equipment.

14. The apparatus according to claim 13, wherein the transceiver is further configured to receive first acknowledgement information sent by the second network node, wherein the first acknowledgement information is sent by the second network node after the second network node receives the sub-uplink transmission configuration information; and wherein the processor is configured to determine, according to the first acknowledgement information, that the second network node is able to receive, according to the sub-uplink transmission configuration information, the second uplink information sent by the user equipment.

15. The apparatus according to claim 9, wherein the first uplink information is feedback information of the first downlink information; and wherein the second uplink information is feedback information of the second downlink information.

16. The apparatus according to claim 9, wherein the transceiver is further configured to add the uplink transmission configuration information to, and send to the user equipment, at least one type of a broadcast message, a Radio Resource Control (RRC) message, a Medium Access Control control element (MAC CE), and a physical layer command.

* * * * *